(12) United States Patent
Yu et al.

(10) Patent No.: US 12,238,544 B2
(45) Date of Patent: Feb. 25, 2025

(54) ELECTRONIC DEVICE FOR DETECTING ERROR AND METHOD FOR OPERATING SAME

(71) Applicant: Samsung Electronics Co., Ltd., Suwon-si (KR)

(72) Inventors: Hyungjoon Yu, Suwon-si (KR); Hyunsung Go, Suwon-si (KR); Youngkwon Lee, Suwon-si (KR); Sungchan Lee, Suwon-si (KR); Sohee Jang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 423 days.

(21) Appl. No.: 17/557,776

(22) Filed: Dec. 21, 2021

(65) Prior Publication Data

US 2022/0201512 A1     Jun. 23, 2022

Related U.S. Application Data

(63) Continuation of application No. PCT/KR2021/019526, filed on Dec. 21, 2021.

(30) Foreign Application Priority Data

Dec. 21, 2020   (KR) .................. 10-2020-0179882

(51) Int. Cl.
  *H04W 24/04*     (2009.01)
  *H04W 36/00*     (2009.01)

(52) U.S. Cl.
  CPC ....... *H04W 24/04* (2013.01); *H04W 36/0085* (2018.08)

(58) Field of Classification Search
  CPC ................... H04W 24/04; H04W 36/0085
  See application file for complete search history.

(56) References Cited

U.S. PATENT DOCUMENTS 8,982,708 B1     3/2015   McCabe et al.
9,344,944 B2 *   5/2016   Jung ................. H04W 36/0085
(Continued)

FOREIGN PATENT DOCUMENTS

KR   10-2009-0093543    9/2009
KR   10-2011-0019689    2/2011
(Continued)

OTHER PUBLICATIONS

Extended European Search Report dated Feb. 7, 2024 issued in European Patent Application No. 21911484.0.
(Continued)

*Primary Examiner* — Brian P Cox
(74) *Attorney, Agent, or Firm* — NIXON & VANDERHYE P.C.

(57) ABSTRACT

According to various embodiments, an electronic device may include: at least one antenna, and at least one processor, wherein the at least one processor is configured to: identify a first frequency for wireless communication through at least one of the at least one antenna, select, based on the first frequency, at least one first radio frequency (RF) path among multiple RF paths positioned between the at least one antenna and the processor, identify an error associated with the at least one first RF path, based on an error associated with the at least one first RF path being identified, stop using the at least one first RF path, and control a communication circuit positioned in at least one second RF path among the multiple RF paths such that a baseband signal is converted into an RF signal, wherein the RF signal is configured to be radiated outwards through at least one antenna corresponding to the at least one second RF path among the at least one antenna. Various other embodiments are also possible.

18 Claims, 20 Drawing Sheets

(56) References Cited

U.S. PATENT DOCUMENTS

| | | | |
|---|---|---|---|
| 2006/0052131 A1* | 3/2006 | Ichihara | H04B 1/005 455/552.1 |
| 2006/0126706 A1* | 6/2006 | Brand | H04M 11/066 375/222 |
| 2007/0189191 A1 | 8/2007 | Ades | |
| 2008/0174470 A1 | 7/2008 | Lum et al. | |
| 2009/0059816 A1 | 3/2009 | Reza et al. | |
| 2012/0044882 A1 | 2/2012 | Kim et al. | |
| 2013/0288690 A1 | 10/2013 | Chou | |
| 2014/0302803 A1 | 10/2014 | Komninakis et al. | |
| 2017/0077966 A1 | 3/2017 | Chen et al. | |
| 2017/0302300 A1 | 10/2017 | Tanaka et al. | |
| 2019/0191421 A1 | 6/2019 | Li et al. | |
| 2019/0230649 A1 | 7/2019 | Huang et al. | |
| 2019/0356446 A1 | 11/2019 | Kim et al. | |
| 2020/0128622 A1* | 4/2020 | Song | H04W 88/06 |
| 2020/0221367 A1 | 7/2020 | Hashemi | |
| 2020/0260265 A1 | 8/2020 | Jin et al. | |
| 2020/0275315 A1 | 8/2020 | Futaki et al. | |
| 2020/0367240 A1 | 11/2020 | Sung et al. | |
| 2021/0022188 A1 | 1/2021 | Yu et al. | |
| 2022/0015002 A1 | 1/2022 | Zhang et al. | |

FOREIGN PATENT DOCUMENTS

| | | |
|---|---|---|
| KR | 10-2014-0136011 | 11/2014 |
| KR | 10-2018-0081450 | 7/2018 |
| KR | 10-2018-0091061 | 8/2018 |
| KR | 10-2019-0112924 | 6/2019 |
| KR | 10-2019-0065101 | 10/2019 |
| KR | 10-2020-0013775 | 2/2020 |
| KR | 10-2020-0099001 | 8/2020 |
| KR | 10-2021-0091320 | 7/2021 |
| KR | 10-2021-0143902 | 11/2021 |
| KR | 10-2022-0041662 | 4/2022 |
| WO | 2019-190094 | 10/2019 |
| WO | 2020/108746 | 6/2020 |

OTHER PUBLICATIONS

Search Report and Written Opinion issued Mar. 30, 2022 in counterpart International Patent Application No. PCT/KR2021/019526.

\* cited by examiner

ELECTRONIC DEVICE FOR DETECTING ERROR AND METHOD FOR OPERATING SAME

CROSS-REFERENCE TO RELATED APPLICATIONS

This application is a continuation of International Application No. PCT/KR2021/019526 designating the United States, filed on Dec. 21, 2021, in the Korean Intellectual Property Receiving Office and claiming priority to Korean Patent Application No. 10-2020-0179882, filed on Dec. 21, 2020, in the Korean Intellectual Property Office, the disclosures of which are incorporated by reference herein in their entireties.

BACKGROUND

Field

The disclosure relates to an electronic device for detecting errors and a method for operating the same and, for example, to an electronic device for detecting transmission-related errors of a transmission module and a method for operating the same.

Description of Related Art

There have been efforts to development 5G communication systems to satisfy wireless data traffic demands that have been increasing since widespread use of portable terminals capable of providing various functions as a result of development of mobile communication technologies. In order to accomplish higher data transmission rates, it has been considered to implement 5G communication systems in higher frequency bands (for example, mmWave band, 25-60 GHz band) in addition to frequency bands that have been used in 3G communication systems and LTE (long term evolution) communication systems such that higher data transmission rates can be provided.

In order to alleviate radio wave path loss in mmWave bands and to increase the radio wave transmission distance in 5G communication systems, there has been discussion on technologies regarding, for example, beamforming, massive MIMO, full dimensional MIMO (FD-MIMO), array antenna, analog beam-forming, and large scale antenna.

In order to perform the above-mentioned communication, an electronic device may include a communication module. The electronic device may transmit data to a base station and/or another electronic device through the communication module, and may receive data transmitted to a base station and/or another electronic device. The communication module of the electronic device may include at least one transmitter module and/or receiver module. For example, an electronic device supporting 5G employs a transceiver module for sub6 (FR1) frequency bands and a transceiver module for mmWave (FR2) frequency bands.

Errors may occur in the transmission path of an electronic device. For example, errors of the transmission path (Tx path) may include errors of power amplification (PA), errors of a switch, errors of a filter, errors of a radio frequency IC (RFIC), and errors of phase locked loop (PLL). Errors of the mmWave transmission path may further include errors of IF RFIC/Phased array modules. The above-mentioned transmission path errors may occur due to various reasons including external impacts.

In general, an electronic device may include multiple reception paths for supporting an antenna diversity function, but may include a single transmission path in most cases. In such a case, even if an error has occurred in one of the reception paths, signals may be received from the base station if other reception paths have no errors. However, if the transmission path has an error, communication between the base station and the electronic device cannot be maintained because transmission signals from the electronic device cannot reach the base station. In the case of an electronic device supporting mmWave, communication with the base station may be disconnected if an error occurs in the IF RFIC/phased array, because there is currently no algorithm for controlling the radio path. Heating and a large amount of current consumption may occur as the electronic device continues to amplify transmission power.

SUMMARY

Embodiments of the disclosure provide and electronic device and a method for operating the same that may identify an error related to a selected RF path, may stop using the corresponding RF path having an identified error, and may perform communication using an RF path other than the corresponding RF path.

According to various example embodiments, an electronic device may include: at least one antenna, and at least one processor, wherein the at least one processor is configured to: identify a first frequency for wireless communication through at least one of the at least one antenna, select, based on the first frequency, at least one first radio frequency (RF) path among multiple RF paths positioned between the at least one antenna and the processor, identify an error associated with the at least one first RF path, and based on an error associated with the at least one first RF path being identified, stop using the at least one first RF path, and control a communication circuit positioned in at least one second RF path among the multiple RF paths such that a baseband signal is converted into an RF signal, and wherein the RF signal is configured to be radiated outwards through at least one antenna corresponding to the at least one second RF path among the at least one antenna.

According to various example embodiments, a method of operating an electronic device including at least one antenna may include: identifying a first frequency for wireless communication through at least one of the at least one antenna, selecting, based on the first frequency, at least one first radio frequency (RF) path among multiple RF paths positioned between the at least one antenna and a processor, identifying an error associated with the at least one first RF path, and based on an error associated with the at least one first RF path being identified, stopping using the at least one first RF path, and controlling a communication circuit positioned in at least one second RF path among the multiple RF paths such that a baseband signal is converted into an RF signal, wherein the RF signal is configured to be radiated outwards through at least one antenna corresponding to the at least one second RF path among the at least one antenna.

Various example embodiments may provide an electronic device and a method for operating the same, wherein, if an error related to a selected RF path is identified, use of the corresponding RF may be stopped, and communication may be performed using an RF path other than the corresponding RF path. This may prevent and/or reduce amplification of transmission power of the electronic device due to continuous use of the corresponding RF path, thereby preventing and/or reducing the occurrence of heating and a large amount of current consumption.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
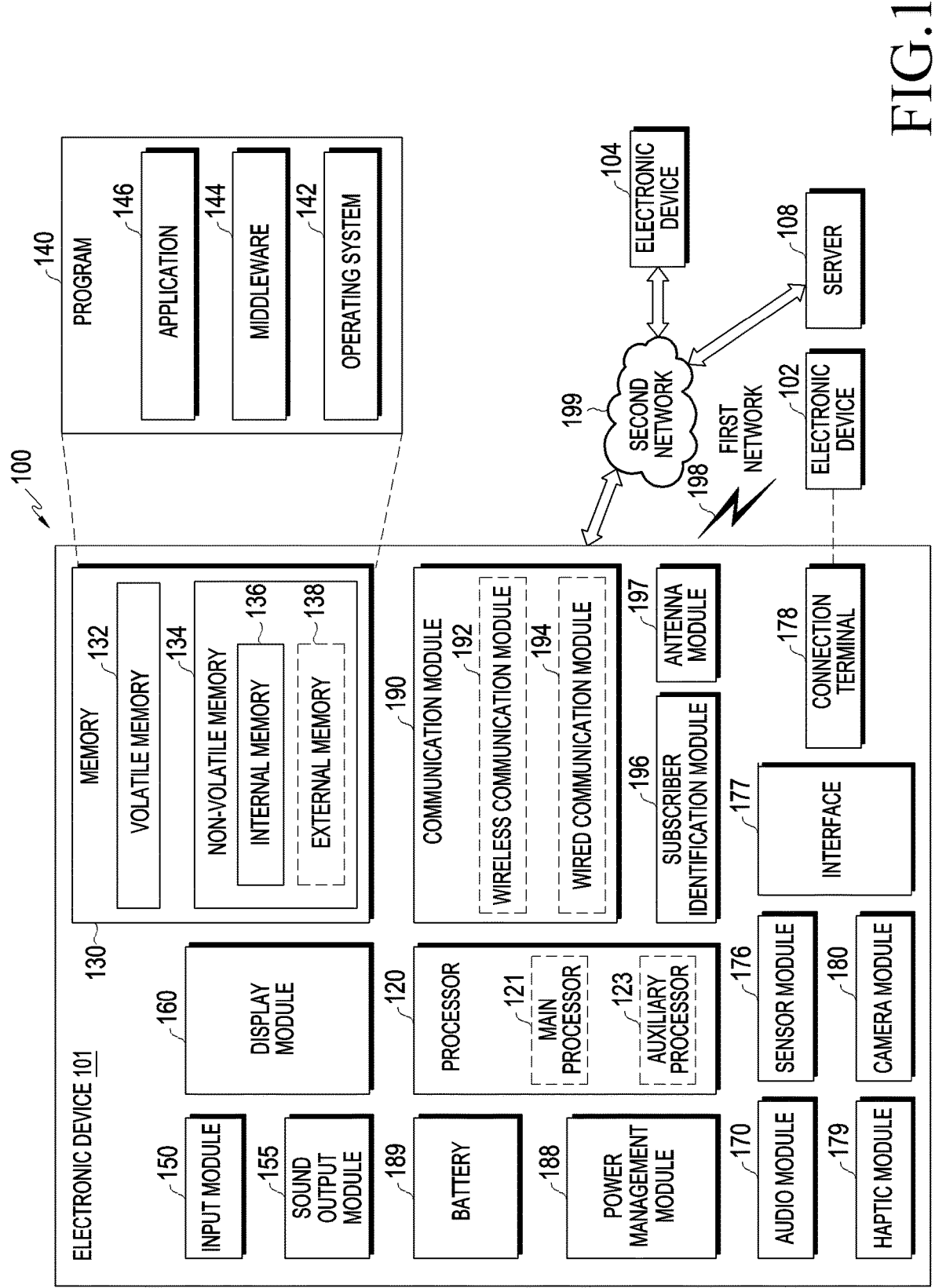
FIG. 1 is a block diagram illustrating an example electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active (e.g., executing an application) state. According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or an external electronic device (e.g., an electronic device 102 (e.g., a speaker or a headphone)) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2A:
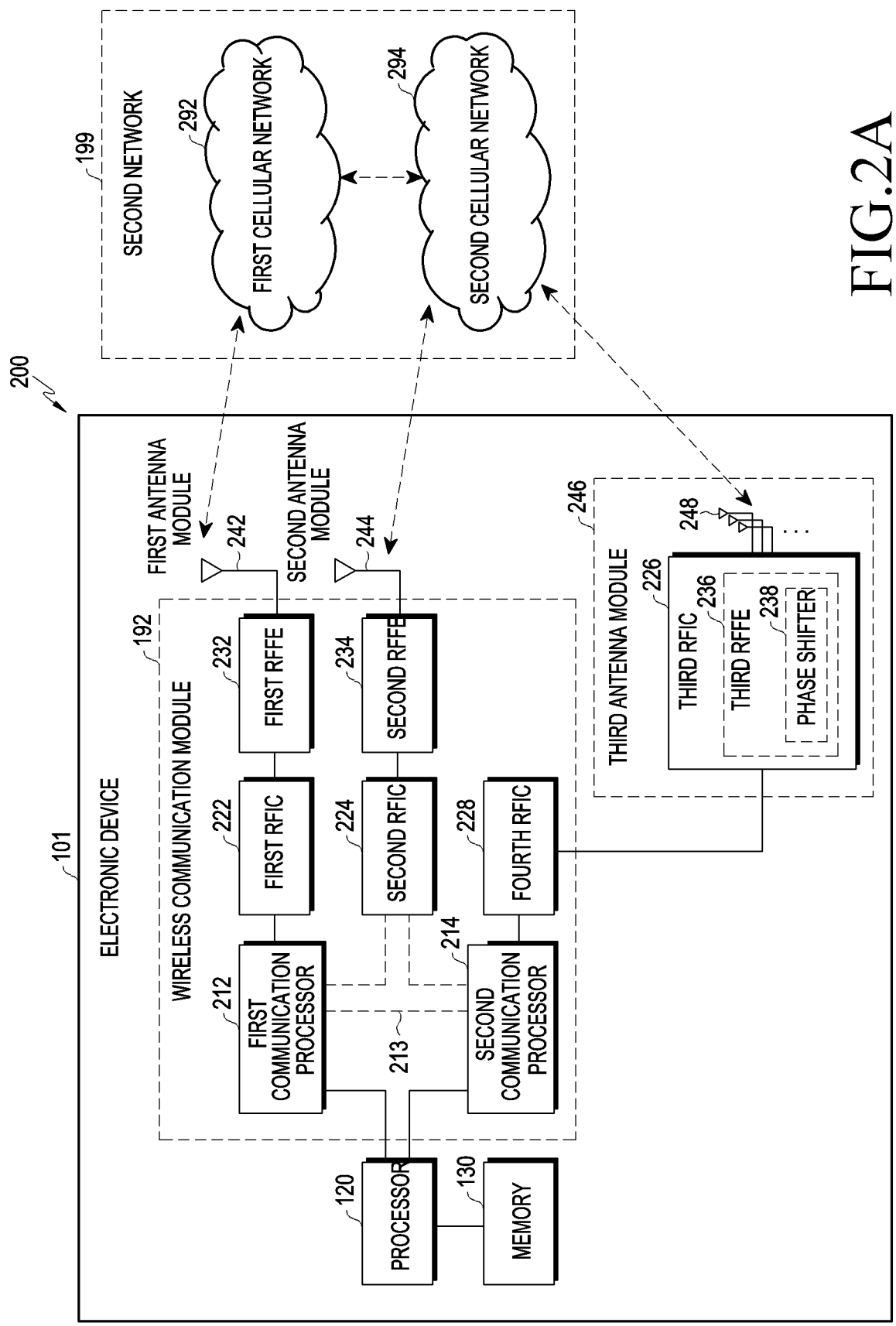
FIG. 2A and FIG. 2B are block diagrams illustrating example configurations of an electronic device for supporting legacy network communication and 5G network communication according to various embodiments.

FIG. 2A is a block diagram 200 illustrating an example configuration of an electronic device 101 for supporting legacy network communication and 5G network communication according to various embodiments. Referring to FIG. 2A, the electronic device 101 may include a first communication processor (e.g., including processing circuitry) 212, a second communication processor (e.g., including processing circuitry) 214, a first radio frequency integrated circuit (RFIC) 222, a second RFIC 224, a third RFIC 226, a fourth RFIC 228, a first radio frequency front end (RFFE) 232, a second RFFE 234, a first antenna module 242, a second antenna module 244, a third antenna module 246, and antennas 248. The electronic device 101 may further include a processor (e.g., including processing circuitry) 120 and a memory 130. A second network 199 may include a first cellular network 292 and a second cellular network 294. According to an embodiment, the electronic device 101 may further include at least one component among the components illustrated in FIG. 1, and the second network 199 may further include at least another network. According to an embodiment, the first communication processor 212, the second communication processor 214, the first RFIC 222, the second RFIC 224, the fourth RFIC 228, the first RFFE 232, and the second RFFE 234 may configure at least a part of the communication module 192. According to an embodiment, the fourth RFIC 228 may be omitted, or may be included as a part of the third RFIC 226.

The first communication processor 212 may include various processing circuitry and establish a communication channel within a band to be used for wireless communication with the first cellular network 292, and may support legacy network communication performed through the established communication channel. According to various embodiments, the first cellular network may be a legacy network including a second generation (2G), 3G, 4G, or long-term evolution (LTE) network. The second communication processor 214 may include various processing circuitry and establish a communication channel corresponding to a designated band (e.g., about 6 GHz-60 GHz) among bands to be used for wireless communication with the second cellular network 294, and may support 5G network communication performed through the established communication channel. According to various embodiments, the second cellular network 294 may be a 5G network defined in 3GPP. Additionally, according to an embodiment, the first communication processor 212 or the second communication processor 214 may establish a communication channel corresponding to another designated band (e.g., about 6 GHz or lower) among bands to be used for wireless communication with the second cellular network 294, and may support 5G network communication performed through the established communication channel.

The first communication processor 212 may transmit or receive data to or from the second communication processor 214. For example, data which has been classified to be transmitted through the second cellular network 294 may be changed to be transmitted through the first cellular network 292. In this case, the first communication processor 212 may receive transmission data from the second communication processor 214. For example, the first communication processor 212 may transmit or receive data to or from the second communication processor 214 through an interprocessor interface 213. The interprocessor interface 213 may be implemented as, for example, a universal asynchronous receiver/transmitter (UART) (e.g., a high speed-UART (HS-UART) or peripheral component interconnect bus express (PCIe) interface), but the type thereof is not limited. Alternatively, the first communication processor 212 and the second communication processor 214 may exchange control information and packet data information using, for example, a shared memory. The first communication processor 212 may transmit or receive, to or from the second communication processor 214, various information, such as sensing information, information on output strength, and resource block (RB) allocation information.

According to implementation, the first communication processor 212 may not be directly connected to the second communication processor 214. In this case, the first communication processor 212 may transmit or receive data to or from the second communication processor 214 through the processor 120 (e.g., an application processor). For example, the first communication processor 212 and the second communication processor 214 may transmit or receive data to or from each other through the processor 120 (e.g., an application processor) and an HS-UART interface or a PCIe interface, but the type of an interface is not limited. Alternatively, the first communication processor 212 and the second communication processor 214 may exchange control information and packet data information using the processor 120 (e.g., an application processor) and a shared memory.

Figure 2B:
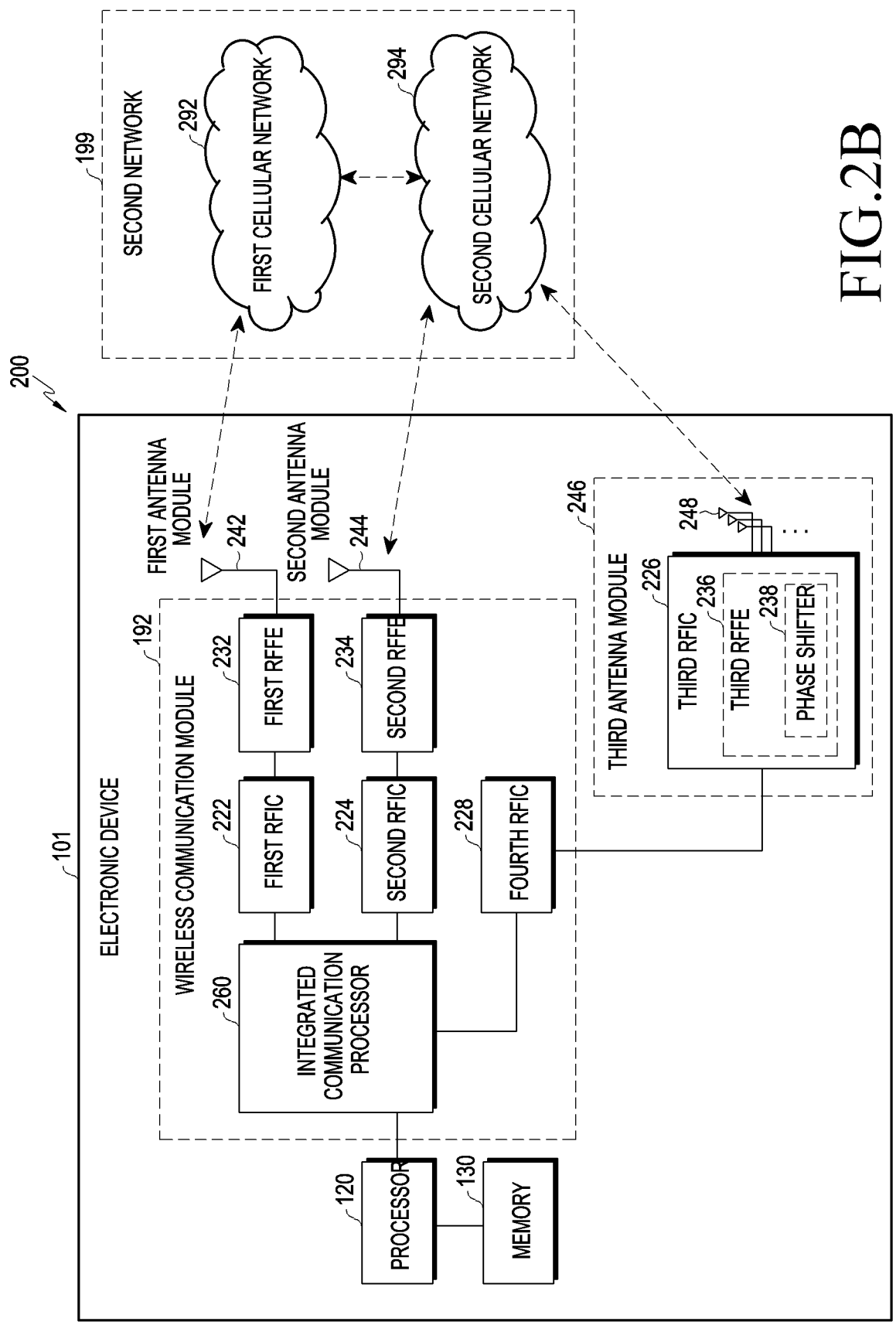

According to an embodiment, the first communication processor 212 and the second communication processor 214 may be implemented in a single chip or a single package. According to various embodiments, the first communication processor 212 or the second communication processor 214 may be configured in a single chip or a single package together with the processor 120, the auxiliary processor 123, or the communication module 190. For example, as illustrated in FIG. 2B, an integrated communication processor (e.g., including processing circuitry) 260 may support both a function for communication with the first cellular network 292 and a function for communication with the second cellular network 294.

The first RFIC 222 may convert, at the time of transmission, a baseband signal generated by the first communication processor 212 into a radio frequency (RF) signal having a frequency of about 700 MHz to about 3 GHz, which is used in the first cellular network 292 (e.g., a legacy network). At the time of reception, an RF signal may be obtained from the first network 292 (e.g., a legacy network) through an antenna (e.g., the first antenna module 242), and may be preprocessed through an RFFE (e.g., the first RFFE 232). The first RFIC 222 may convert a preprocessed RF signal into a baseband signal so as to enable the preprocessed RF signal to be processed by the first communication processor 212.

The second RFIC 224 may convert, at the time of transmission, a baseband signal generated by the first communication processor 212 or the second communication processor 214 into a RF signal (hereinafter, a 5G Sub6 RF signal) within a Sub6 band (e.g., about 6 GHz or lower) used in the second cellular network 294 (e.g., a 5G network). At the time of reception, a 5G Sub6 RF signal may be obtained from the second cellular network 294 (e.g., a 5G network) through an antenna (e.g., the second antenna module 244), and may be preprocessed through an RFFE (e.g., the second RFFE 234). The second RFIC 224 may convert a preprocessed 5G Sub6 RF signal into a baseband signal so as to enable the preprocessed 5G Sub6 RF signal to be processed by a corresponding communication processor among the first communication processor 212 or the second communication processor 214.

The third RFIC 226 may convert a baseband signal generated by the second communication processor 214 into a RF signal (hereinafter, a 5G Above6 RF signal) within a 5G Above6 band (e.g., about 6 GHz-about 60 GHz) to be used in the second cellular network 294 (e.g., a 5G network). At the time of reception, a 5G Above6 RF signal may be obtained from the second cellular network 294 (e.g., a 5G network) through an antenna (e.g., the antenna 248), and may be preprocessed through a third RFFE 236. The third RFIC 226 may convert a preprocessed 5G Above6 RF signal into a baseband signal so as to enable the preprocessed 5G Above6 RF signal to be processed by the second communication processor 214. According to an embodiment, the third RFFE 236 may be configured as a part of the third RFIC 226.

According to an embodiment, the electronic device 101 may include the fourth RFIC 228 separately from or at least a part of the third RFIC 226. In this case, the fourth RFIC 228 may convert a baseband signal generated by the second communication processor 214 into an RF signal (hereinafter, an IF signal) within an intermediate frequency band (e.g., about 9 GHz-11 GHz), and then transfer the IF signal to the third RFIC 226. The third RFIC 226 may convert an IF signal into a 5G Above6 RF signal. At the time of reception, a 5G Above6 RF signal may be received from the second cellular network 294 (e.g., a 5G network) through an antenna (e.g., the antenna 248), and may be converted into an IF signal by the third RFFE 226. The fourth RFIC 228 may convert an IF signal into a baseband signal so as to enable the IF signal to be processed by the second communication processor 214.

According to an embodiment, the first RFIC 222 and the second RFIC 224 may be implemented as at least a part of a single chip or a single package. According to various embodiments, as illustrated in FIG. 2A or FIG. 2B, when the first RFIC 222 and the second RFIC 224 are implemented as a single chip or a single package, the first RFIC and the second RFIC may be implemented as an integrated RFIC. In this case, the integrated RFIC may be connected to the first RFFE 232 and the second RFFE 234 so as to convert a baseband signal into a signal within a band supported by the first RFFE 232 and/or the second RFFE 234, and transmit the converted signal to one of the first RFFE 232 and the second RFFE 234. According to an embodiment, the first RFFE 232 and the second RFFE 234 may be implemented as at least a part of a single chip or a single package. According to an embodiment, at least one antenna module among the first antenna module 242 or the second antenna module 244 may be omitted or combined with another antenna module so as to process RF signals within multiple corresponding bands.

According to an embodiment, the third RFIC 226 and the antenna 248 may be arranged on the same substrate so as to configure the third antenna module 246. For example, the communication module 192 or the processor 120 may be disposed on a first substrate (e.g., a main PCB). In this case, the third RFIC 226 may be disposed in a partial area (e.g., a lower surface) of a second substrate (e.g., a sub PCB) separate from the first substrate, and the antenna 248 may be disposed in another partial area (e.g., an upper surface), so as to configure the third antenna module 246. The length of a transmission line between the third RFIC 226 and the antenna 248 can be reduced by arranging the third RFIC and the antenna on the same substrate. Therefore, for example, loss (e.g., attenuation) of, by a transmission line, a signal within a high frequency band (e.g., about 6 GHz-about 60 GHz) used for 5G network communication can be reduced. Accordingly, the electronic device 101 can improve the quality or speed of communication with the second network 294 (e.g., a 5G network).

According to an embodiment, the antenna 248 may be configured to be an antenna array including multiple antenna elements which are usable for beamforming. In this case, the third RFIC 226 may include, for example, as a part of the third RFFE 236, multiple phase shifters 238 corresponding to the multiple antenna elements. At the time of transmission, each of the multiple phase shifters 238 may convert the phase of a 5G Above6 RF signal to be transmitted to an outside (e.g., a base station of a 5G network) of the electronic device 101 through a corresponding antenna element. At the time of reception, each of the multiple phase shifters 238 may convert, into an identical or a substantially identical phase, the phase of a 5G Above6 RF signal which has been received from the outside through a corresponding antenna element. This process enables transmission or reception through beamforming between the electronic device 101 and the outside.

The second cellular network 294 (e.g., a 5G network) may be operated independently to the first cellular network 292 (e.g., a legacy network) (e.g., stand-alone (SA), or may be operated while being connected thereto (e.g., non-standalone (NSA)). For example, there may be only an access network (e.g., a 5G radio access network (RAN) or a next generation RAN (NG RAN)) in a 5G network without a core network (e.g., a next generation core (NGC)). In this case, the electronic device 101 may access a access network of a 5G network, and then access an external network (e.g., Internet) under the control of a core network (e.g., an evolved packed core (EPC)) of a legacy network. Protocol information (e.g., LTE protocol information) for communication with a legacy network or protocol information (e.g., new radio (NR) protocol information) for communication with a 5G network may be stored in the memory 230, and may be accessed by another component (e.g., the protocol 120, the first communication protocol 212, or the second communication protocol 214).

Figure 3A:
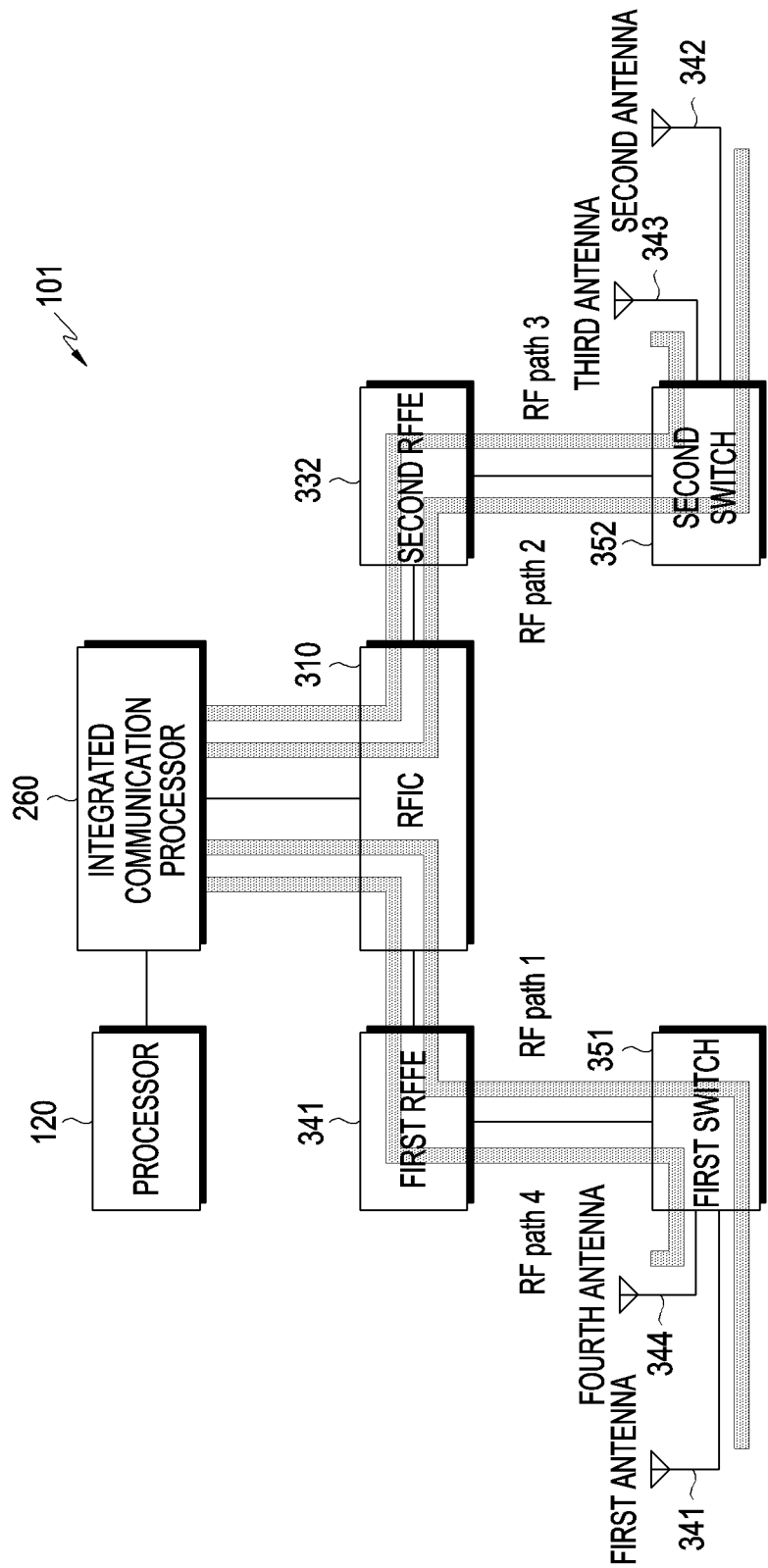
FIG. 3A and FIG. 3B are block diagrams illustrating example configurations of an electronic device according to various embodiments.
Figure 3B:
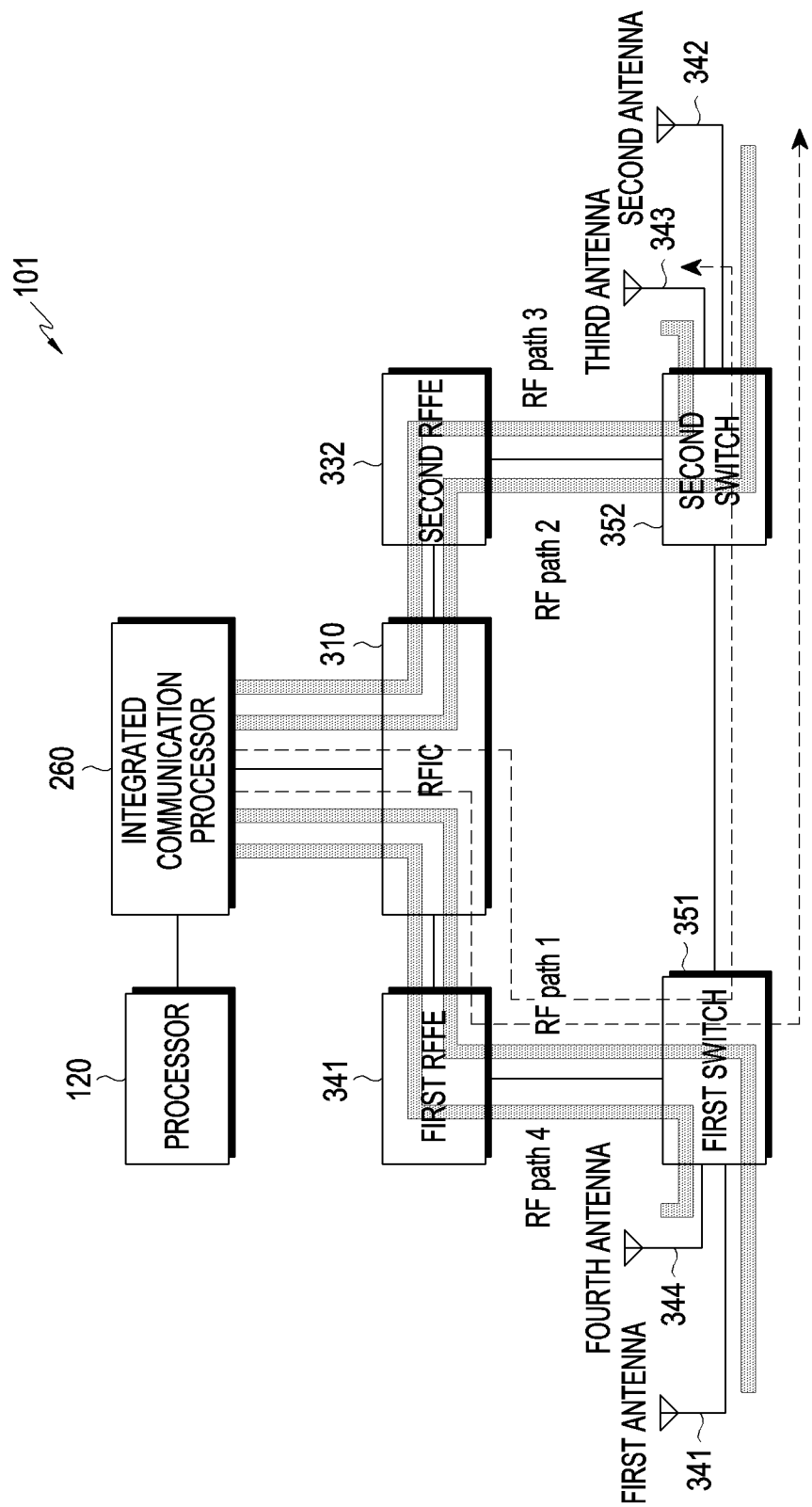

FIG. 3A and FIG. 3B are block diagrams illustrating an example configuration of an electronic device according to various embodiments.

Referring to FIG. 3A, an electronic device (e.g., the electronic device 101 in FIG. 1) according to various embodiments may include the processor 120, the integrated communication processor 260, an RFIC 310, a first RFFE 331, a second RFFE 332, a first antenna 341, a second antenna 342, a third antenna 343, a fourth antenna 344, a first switch 351, and/or a second switch 352.

According to various embodiments, the RFIC 310 may, at the time of transmission, convert a baseband signal generated by the integrated communication processor 260 into a wireless frequency (RF) signal used in a first communication network or a second communication network. For example, the RFIC 310 may transmit an RF signal used in the first communication network to the first antenna 341 or the fourth antenna 344 through the first RFFE 331 and the first switch 351. The RFIC 310 may transmit an RF signal used in the first communication network or the second communication network to the second antenna 342 or the third antenna 343 through the second RFFE 332 and the second switch 352. According to various embodiments, the RFIC 310 may transmit an RF signal corresponding to the first communication network to the first antenna 341 or the fourth antenna 344 through the first RFFE 331, and may transmit an RF signal corresponding to the second communication network to the second antenna 342 or the third antenna 343 through the second RFFE 332.

According to various embodiments, a transmission RF path for transmission from the RFIC 310 to the first antenna 341 through the first RFFE 331 and the first switch 351 may be referred to as "a first RF path (RF path 1)". A transmission RF path for transmission from the RFIC 310 to the fourth antenna 344 through the first RFFE 331 and the first switch 351 may be referred to as "a fourth RF path (RF path 4)". An RF path as described above may indicate, for example, a path for converting a baseband signal output from the integrated communication processor 260 into an RF signal, and radiating the RF signal through at least one of the antennas 341, 342, 343, and 344 as a physical communication signal, or at least one hardware associated with the corresponding RF path. In various embodiments, an operation of performing communication, based on a particular RF path may include an operation of transmitting and/or receiving a signal through at least partial hardware included in the particular RF path. An operation of performing communication, based on a particular RF path, may include at least a first operation of allowing operation of at least one first hardware (e.g., an RFIC and/or an RFFE) associated with the particular RF path, and/or a second operation (e.g., on/off control of at least one switch) of controlling at least one second hardware (e.g., an antenna) associated with the particular RF path, to be connected to the RF path.

According to various embodiments, the RFIC 310 may, at the time of transmission, convert a baseband signal generated by the integrated communication processor 260 into a wireless frequency (RF) signal used in the first communication network or the second communication network. For example, the RFIC 310 may transmit an RF signal used in the first communication network or the second communication network to the second antenna 342 or the third antenna 343 through the second RFFE 332 and the second switch 351.

According to various embodiments, a transmission RF path for transmission from the RFIC 310 to the second antenna 342 through the second RFFE 332 and the second switch 352 may be referred to as "a second RF path (RF path 2)". A transmission RF path for transmission from the RFIC 310 to the third antenna 343 through the second RFFE 332 and the second switch 352 may be referred to as "a third RF path (RF path 3)".

According to various embodiments, the first RF path (RF path 1) may be able to be used concurrently with the second RF path (RF path 2), may be able to be used concurrently with the third RF path (RF path 3), and may be unable to be used concurrently with the fourth RF path (RF path 4). The second RF path (RF path 2) may be unable to be used concurrently with the third RF path (RF path 3), may be able to be used concurrently with the first RF path (RF path 1), and may be able to be used concurrently with the fourth RF path (RF path 4). The third RF path (RF path 3) may be unable to be used concurrently with the second RF path (RF path 2), may be able to be used concurrently with the first RF path (RF path 1), and may be able to be used concurrently with the fourth RF path (RF path 4). The fourth RF path (RF path 4) may be unable to be used concurrently with the first RF path (RF path 1), may be able to be used concurrently with the third RF path (RF path 3), and may be able to be used concurrently with the second RF path (RF path 2).

For example, the electronic device 101 may store, in advance, information relating to at least one frequency for each RF path as shown in Table 1.

TABLE 1

| Frequency | RF path | RF resource |
|---|---|---|
| At least one first frequency | First RF path | First antenna 341 |
| At least one second frequency | Second RF path | Second antenna 342 |
| At least one third frequency | Third RF path | Third antenna 343 |
| At least one fourth frequency | Forth RF path | Fourth antenna 344 |

The electronic device 101 may also store information including at least one frequency band in addition to or in replacement of at least one frequency. In various embodiments, it will be understood that a frequency can be interchangeably used with a frequency band. The electronic device 101 may store information including both an RF path and an RF resource as shown in Table 1, but may also store information including one of an RF path and an RF resource. In Table 1, at least one frequency may be configured for one antenna. For example, a first frequency band and a second frequency band belonging to a low band may be mapped to the first antenna 341. For example, the second frequency band belonging to a low band, and a third frequency band and a fourth frequency band belonging to a mid-band may be mapped to the second antenna 342. The fourth frequency band belonging to a mid-band, and a fifth frequency band and a sixth frequency band belonging to a high band may be mapped to the third antenna 343. A seventh frequency band belonging to an ultra-high band may be mapped to the fourth antenna 344. As in the above example, multiple frequency bands may be mapped to one antenna, but this example also corresponds to an example, and one frequency band may be mapped to one antenna.

For example, it may be assumed that the electronic device 101 selects the first RF path (RF path 1), and uses a first frequency for communication. The selection of the first RF path (RF path 1) may imply, for example, operating of a hardware associated with the first RF path (RF path 1), and control a switch state so as to allow a signal to be provided through the first RF path (RF path 1).

According to various embodiments, the first communication network and the second communication network may be communication networks corresponding to different radio access technologies (RATs). For example, the first communication network may be a 5G network, and the second communication network may be a legacy network (e.g., an LTE network). In a case where the first communication network is a 5G network, one of the first RFFE 331 or the second RFFE 332 may be designed to be suitable to process a signal corresponding to the 5G network, and the remaining one may be designed to be suitable to process a signal corresponding to a legacy network. According to an embodiment, the first communication network and the second communication network may be communication networks corresponding to the same radio access technologies (RATs).

Referring to FIG. 3B, according to various embodiments, the first switch 351 and the second switch 352 may be connected to each other. Accordingly, for example, a signal from the first RFFE 331 may be provided to at least a part of the first antenna 341, the second antenna 342, the third antenna 343, or the fourth antenna 344, based on an on/off state of each of sub switches included in the first switch 351 and the second switch 352. For example, a signal from the second RFFE 332 may be provided to at least a part of the first antenna 341, the second antenna 342, the third antenna 343, or the fourth antenna 344, based on an on/off state of each of sub switches included in the first switch 351 and the second switch 352. A reception signal received through the first antenna 341, the second antenna 342, the third antenna 343, or the fourth antenna 344 may also be provided to one of the first RFFE 331 or the second RFFE 332, based on an on/off state of each of sub switches included in the first switch 351 and the second switch 352.

Figure 4:
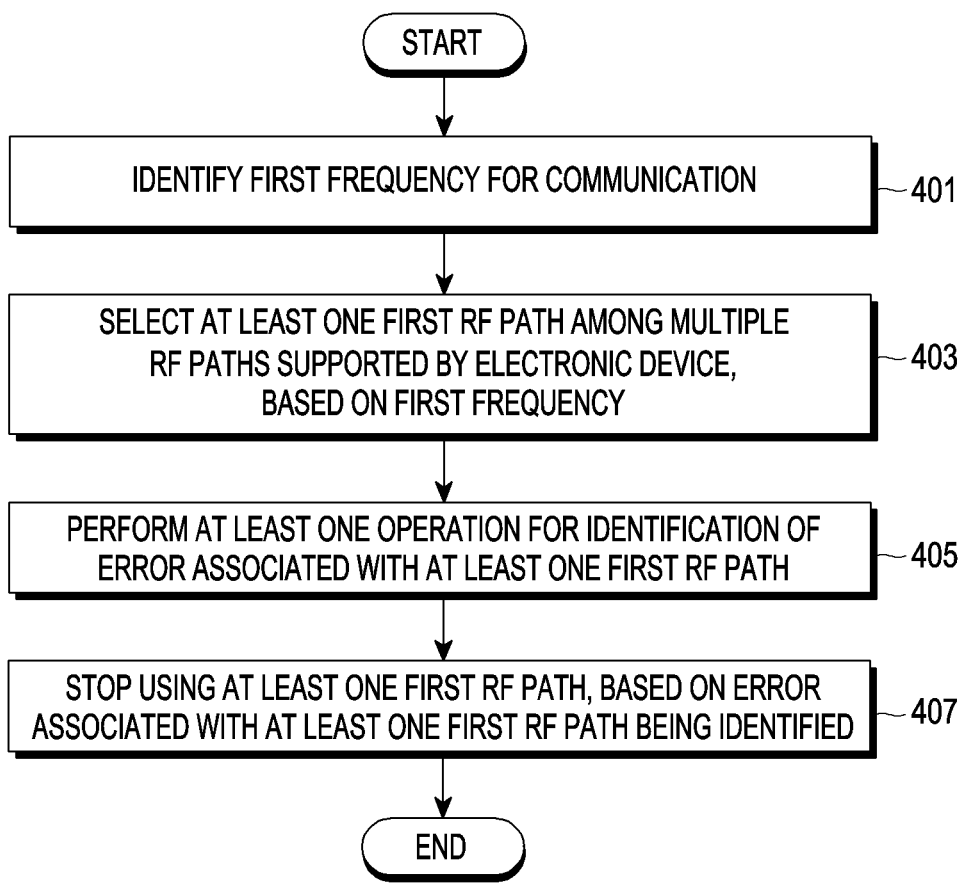
FIG. 4 is a flowchart illustrating an example method of operating an electronic device according to various embodiments.

FIG. 4 is a flowchart illustrating an example method of operating an electronic device according to various embodiments.

According to various embodiments, the electronic device 101 (e.g., at least one of the processor 120, the first communication processor 212, the second communication processor 214, or the integrated communication processor 260) may identify a first frequency for communication in operation 401. The electronic device 101 may support multiple frequencies, and may identify the first frequency used to perform communication among the frequencies. The first frequency may be selected by the electronic device 101 and/or a network. In an example, the electronic device 101 may identify a frequency satisfying a cell selection condition or a cell re-selection condition during a cell selection process based on cell selection or cell re-selection, and may perform a subsequent procedure (e.g., an RACH procedure), based on the identified frequency. In an example, the electronic device 101 may perform, for a handover, a measurement report (MR) which is a report of a result of measuring a particular frequency, and may perform a handover procedure for the particular frequency, based on receiving a handover command from the network. In an example, the electronic device 101 may receive an RRC release message (e.g., an RRCConnecitonRelease message or an RRC Release message) indicating redirection from the network, and may perform a procedure of redirection to the first frequency included in the corresponding message. In an example, the electronic device 101 may perform a measurement report (MR) of a particular frequency for dual connectivity secondary cell group (SCG) addition. As described above, the electronic device 101 and/or the network may select a particular frequency (e.g., the first frequency) in various examples, and the electronic device 101 may identify same.

According to various embodiments, the electronic device 101 may select, in operation 403, a first RF path among multiple RF paths supported by the electronic device 101, based on the first frequency. For example, the electronic device 101 may map and store association information (e.g., association information in Table 1) relating to an RF path available for each frequency in advance. As described above, an RF path may indicate a set of at least one hardware used in the process where a baseband signal is converted into an actual physical signal, and those skilled in the art will understand that identification information of at least one hardware in a corresponding set can also be managed for each frequency instead of an RF path.

According to various embodiments, in operation 405, the electronic device 101 may perform at least one operation for identification of an error associated with the at least one first RF path. For example, the electronic device 101 may request a response of identification information from at least one RF device associated with the at least one first RF path, and identify whether there is an error, based on whether a response for the request is received. In an example, the electronic device 101 may, when booted, request (e.g., broadcast) a response of identification information of an RF device, and the RF device may response through a response message. In another example, the electronic device 101 may, after booted, transmit a signal for requesting whether an error has occurred, and may receive a response message corresponding to the signal from an RF device, for example, at least one communication circuit positioned in an RF path. If a response is not identified, or a response message indicating an error is received, the electronic device 101 may identify that an error associated with the at least one first RF path has occurred. For example, the electronic device 101 may identify whether there is an error, based on the difference and/or ratio between a target power and an actually measured transmission power. The electronic device 101 may control the at least one RF device associated with the first RF path so as to allow the target power to be input to an antenna port. If the difference and/or ratio between the target power and the actually measured transmission power satisfies a designated error condition, the electronic device 101 may identify that an error associated with the at least one first RF path has occurred.

According to various embodiments, the electronic device 101 may, in operation 407, stop using the at least one first RF path, based on an error associated with the at least one first RF path being identified. The electronic device 101 may use a different RF path in a case where the different RF path is available for the first frequency. The electronic device 101 may use a second frequency in a radio access technology (RAT) being currently used, or use a different RAT in a case where a different RF path is not available for the first frequency. The electronic device 101 may stop using an RFFE (e.g., phase shifters) being currently used, and use a different RFFE, if a frequency of FR2 is used. If a frequency of FR2 is used, and errors associated with RF paths corresponding to all RFFEs are identified, the electronic device 101 may use an RF path corresponding to FR1, or perform RAT fallback or system fallback.

Figure 5A:
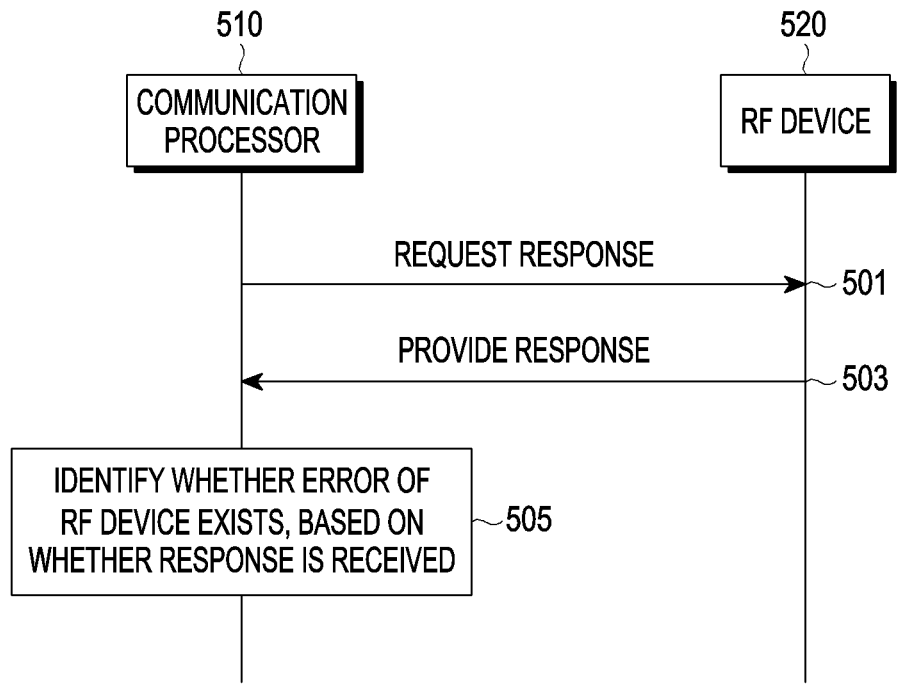
FIG. 5A is a signal flow diagram illustrating an example method of operation an electronic device according to various embodiments.
Figure 5B:
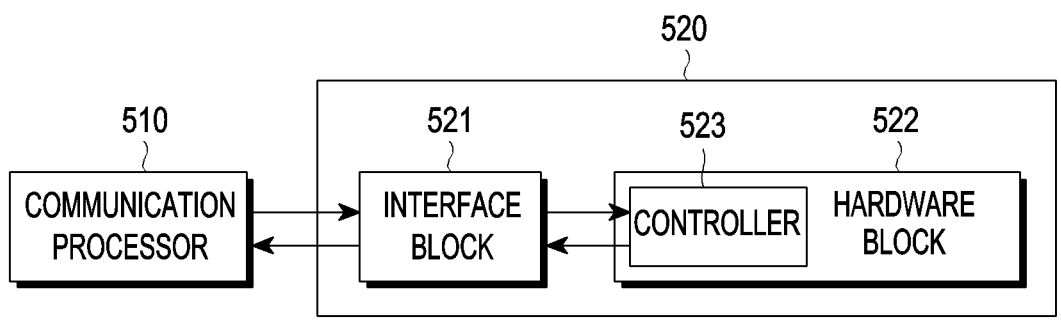
FIG. 5B is a diagram illustrating example scanning between a communication processor and an RF device according to various embodiments.

FIG. 5A is a signal flow diagram illustrating an example method of operating an electronic device according to various embodiments. FIG. 5A will be described with reference with FIG. 5B. FIG. 5B is a diagram illustrating example scanning between a communication processor and an RF device according to various embodiments.

According to various embodiments, the electronic device 101, for example, a communication processor (e.g., including processing circuitry) 510 in FIG. 5B, may request a response from an RF device 520 in operation 501. The communication processor 510 in FIG. 5B may be at least one of, for example, the processor 120, the first communication processor 212, the second communication processor 214, or the integrated communication processor 260. For example, the communication processor 510 may request a response from the RF device 520 through a mobile industry processor interface (MIPI) bus. The RF device 520 is, for example, a hardware for transmission and/or reception of an RF signal, may be an RFIC and/or an RFFE and is not limited if the RF device is at least one communication circuit hardware positioned in an RF path so as to process an RF signal. The RF device may be named a communication circuit in the disclosure. For example, the RF device 520 may include an interface block 521 and a hardware block 522 as illustrated in FIG. 5B, and the hardware block 522 may include a controller 523. The interface block 521 may perform data transmission or reception between the communication processor 510 and the RF device 520, and may be implemented as, for example, an MIPI block, but there is no limit to the interface type and the type of the interface block 521. For example, a serial interface or a manufacturer-customized interface may also be used, and there is no limitation on the type thereof. The hardware block 522 may include at least one hardware configured to perform processing for transmission and/or reception of an RF signal. The controller 523 may control at least one hardware included in the hardware block 522 and configured to perform processing of an RF signal. For example, the controller 523 may control at least one hardware configured to perform processing of an RF signal, based on a command received from the communication processor 510 through the interface block 521. The response is requested, for example, after the electronic device 101 is booted, but there is no limit to the time point of the request or the trigger of the request.

Referring to FIG. 5A, in operation 503, the RF device 520 may provide a response to the communication processor 510 in response to the request of operation 501. For example, in a case where an MIPI is used between the communication processor 510 and the RF device 520, the communication processor 510 may request a unique slave identifier (USID) of the RF device 520 from the RF device 520. The RF device 520 may provide a USID (e.g., a manufacturer id (mid) and/or a product id (pid)) to the communication processor 510 in response to the request.

According to various embodiments, the communication processor 510 may, in operation 505, identify whether an error of the RF device 520 exists, based on whether a response is received. For example, in a case where the requested response is not received from the RF device 520, the communication processor 510 may identify that an error has occurred in the corresponding RF device 520. The communication processor 510 may manage the occurrence of an error in the corresponding RF device 520. For example, in a case where an error has occurred in the interface block 521 and/or the hardware block 522, the RF device 520 may fail to provide a response. Thereafter, in a case where the communication processor 510 selects an RF path associated with the corresponding RF device 520 as an RF path for communication, the electronic device 101 may stop using the corresponding RF path, and perform at least one operation for using a different RF path.

Figure 6:
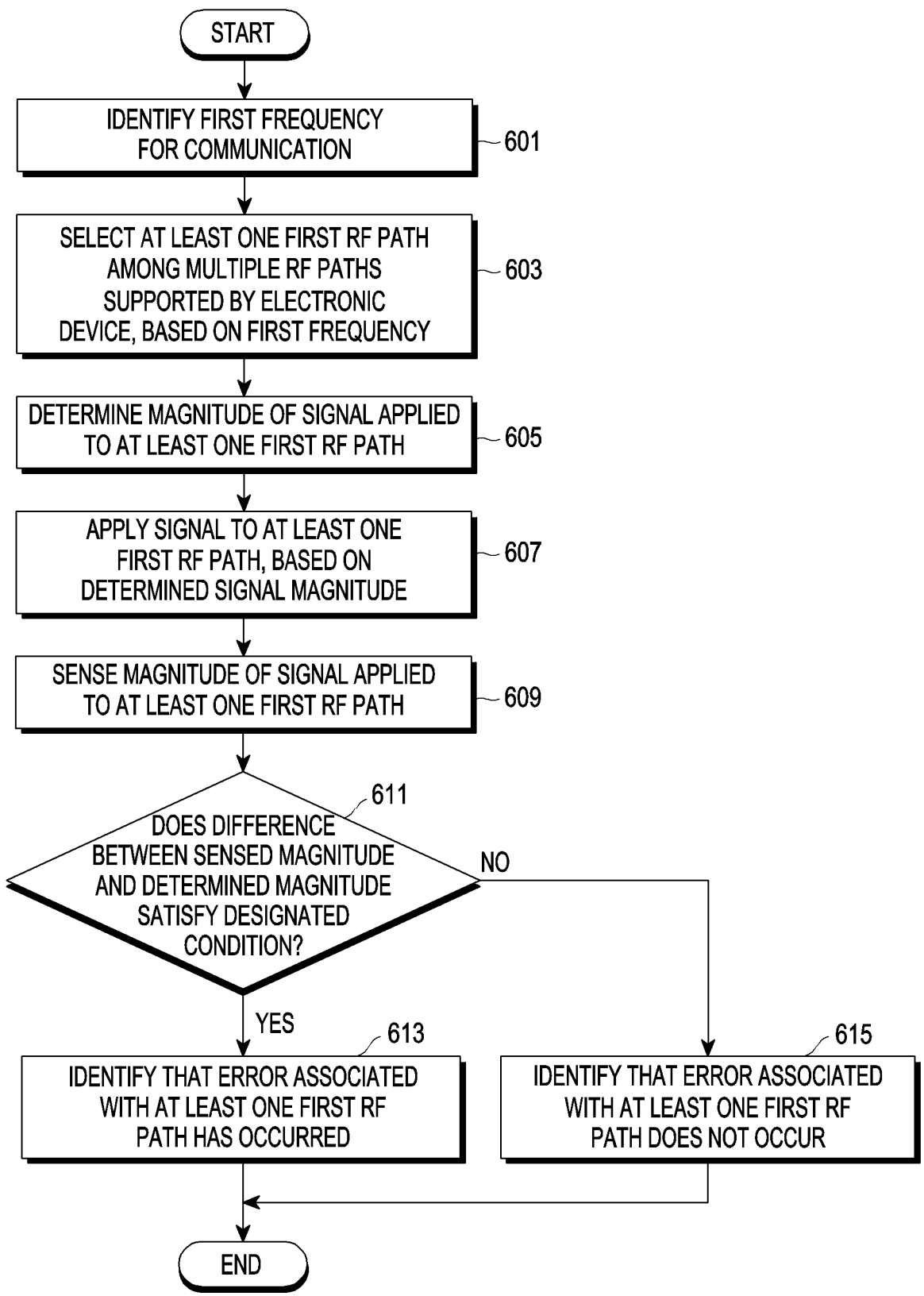
FIG. 6 is a flowchart illustrating an example method of operating an electronic device according to various embodiments.

FIG. 6 is a flowchart illustrating an example method of operating an electronic device according to various embodiments.

According to various embodiments, the electronic device 101 (e.g., at least one of the processor 120, the first communication processor 212, the second communication processor 214, or the integrated communication processor 260) may identify a first frequency for communication in operation 601. The identification of the first frequency has been described above, and thus a detailed description thereof is omitted. In operation 603, the electronic device 101 may select at least one first RF path among multiple RF paths supported by the electronic device 101, based on the first frequency. For example, the electronic device 101 may select a first RF path (e.g., a first antenna) corresponding to the identified first frequency using association information as shown in Table 1.

According to various embodiments, the electronic device 101 may, in operation 605, determine the magnitude of a signal applied to the at least one first RF path. For example, the electronic device 101 may determine the magnitude of each signal to be transmitted. In an example, in a case where the electronic device 101 transmits a signal based on a PUSCH, the transmission power of a PUSCH may be determined based on Equation 1.

$$P_{PUSCH}(i) = \min\{P_{CMAX}, 10\log_{10}(M_{PUSCH}(i)) + P_{O\_PUSCH}(j) + \alpha(j) \cdot PL + \Delta_{TF}(i) + f(i)\}$$ [Equation 1]

PCMAX is maximum output power of the electronic device 101. MPUSCH(i) is the number of resource blocks assigned to the electronic device 101. PO_PUSCH(j) is the sum of PO_NOMINAL_PUSCH(j)(a parameter specified by a cell) and PO_UE_PUSCH(j)(a parameter specified by the electronic device 101). PL is a downlink path-loss measured in the electronic device 101. A scaling factor ($\alpha(j)$) may be determined in a higher layer in consideration of a path-loss mismatch between an uplink channel and a downlink channel $\Delta TF(i)$ is a modulation and coding scheme (MCS) compensation parameter or a transport format (TF) compensation parameter. f(i) is a value adjusted by downlink control information) (DCI) from a base station after initial configuration. At least some of the parameters of Equation 1 may follow, for example, 3GPP TS 36.213. The electronic device 101 may configure, as a transmission power, the smaller one between a calculated PUSCH transmission power and the maximum output power, for example, as shown in Equation 1. The maximum output power configured for the electronic device 101 may be defined based on, for example, a class of the electronic device 101. Output power may be additionally backed off by, for example, a SAR event, or dynamic power sharing (DPS) with a different RAT. In the above example, a transmission power of a PUSCH has been described, but a transmission power may also be configured for various channels (e.g., a PUCCH or a PRACH) (or a signal, for example, an SRS) as well as a PUSCH, and the configuration method thereof may follow, for example, 3GPP TS 36.213 or 3GPP TS 38.213.

According to various embodiments, the electronic device 101 may, in operation 607, apply a signal to the at least one first RF path, based on the determined signal magnitude. The electronic device 101 may control at least one RF device associated with the first RF path such that an RF signal having the determined magnitude is input to an antenna port. For example, the electronic device 101 may control an amplifier associated with the first RF path, but there is no limitation on the type and/or the number of RF devices to be controlled.

According to various embodiments, the electronic device 101 may, in operation 609, sense the magnitude of a signal applied to the at least one first RF path. For example, the electronic device 101 may sense the magnitude of an RF signal applied to the antenna port, but there is no limitation if the position is the same as a target power configuration position, and there is also no limit to the target power configuration position.

According to various embodiments, the electronic device 101 may, in operation 611, identify whether the difference between the sensed magnitude and the determined magnitude satisfies a designated condition. The electronic device 101 may also identify whether the ratio satisfies a designated condition, in replacement of or in addition to the difference. The designated condition may be configured to be a condition corresponding to a case where an error associated with the RF path has occurred. The designated condition may indicate, for example, that the difference between the sensed magnitude and the determined magnitude is equal to or greater than a threshold value, but the disclosure is not limited thereto. The designated condition may be the same for each channel (or signal), but may be differently configured. For example, a threshold value used in a case of PUCCH or PUSCH transmission and a threshold value used in a case of SRS transmission may be the same, but may be different from each other in some cases. The designated condition may be differently configured for each target power. For example, a threshold value of a case where the target power is a first magnitude (e.g., 23 dBm) and a threshold value of a case where the target power is a second magnitude (e.g., 20 dBm) may be the same, but may be different from each other in some cases. When it is identified that the designated condition is satisfied (operation 611-Yes), the electronic device 101 may, in operation 613, identify that an error associated with the at least one first RF path has occurred. For example, in a case where the difference and/or ratio between the target power and the sensed power is equal to or greater than a threshold value, the electronic device 101 may identify that an error associated with the first RF path has occurred. When it is identified that the designated condition is not satisfied (operation 611-No), the electronic device 101 may, in operation 615, identify that an error associated with the at least one first RF path does not occur. When it is identified that an error has occurred, the electronic device 101 may stop using the first RF path, and may perform at least one operation for using a different RF path, and this will be described in greater detail below.

Figure 7:
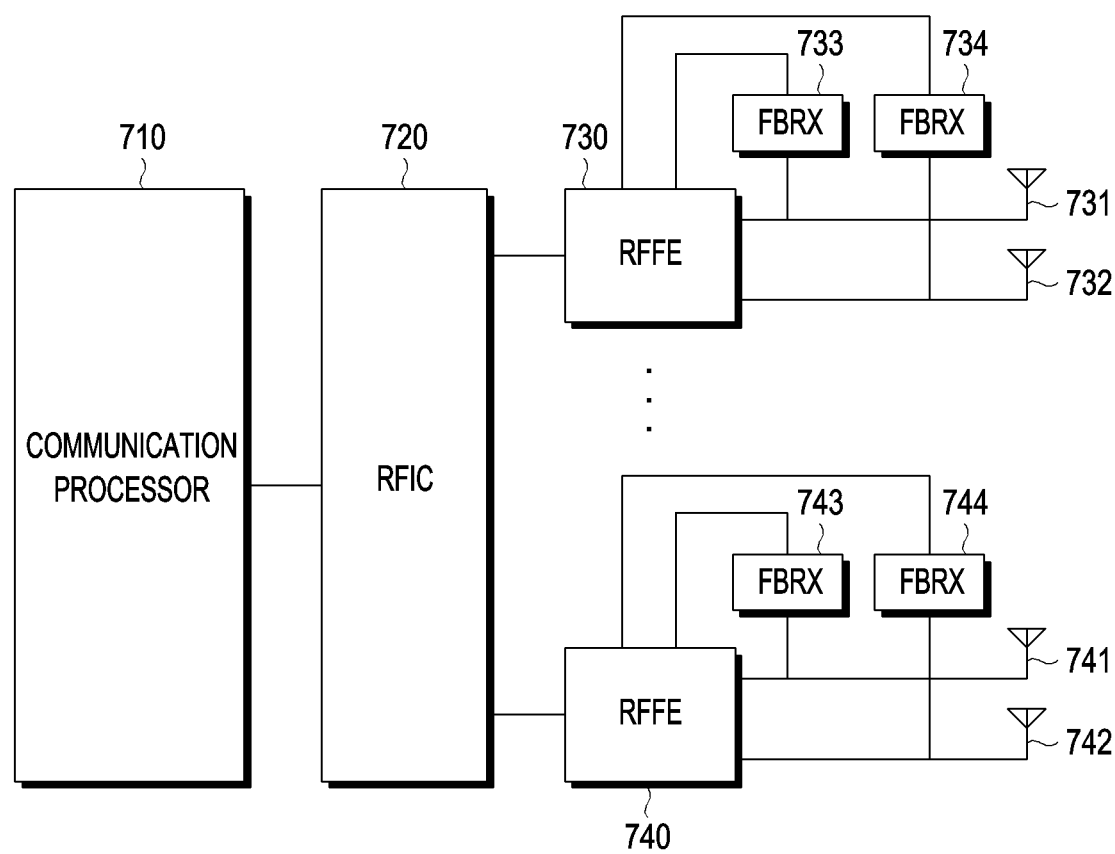
FIG. 7 is a block diagram illustrating an example configuration of an electronic device according to various embodiments.

FIG. 7 is a block diagram illustrating an example configuration of an electronic device according to various embodiments.

According to various embodiments, the electronic device 101 may include at least one of a communication processor (e.g., including processing circuitry) 710, an RFIC 720, RFFEs 730 and 740, antennas 731, 732, 741, and 743, and/or feedback receivers (FBRXs) 733, 734, 743, and 744. The communication processor 710 may include at least one of, for example, the processor 120, the first communication processor 212, the second communication processor 214, or the integrated communication processor 260. The communication processor 710 illustrated in FIG. 7 may support, for example, LTE communication and/or a FR1 frequency of 5G communication. The RFIC 720 may include, for example, the first RFIC 222 and/or the second RFIC 224. The RFFEs 730 and 740 may include, for example, the first RFFE 232 and/or the second RFFE 234. The two antennas 731 and 732 are illustrated to be connected to the RFFE 730, and the two antennas 741 and 742 are illustrated to be connected to the RFFE 740, but there is no limitation on the number of antennas connected thereto.

According to various embodiments, the communication processor 710 may select a first frequency and identify a first RF path corresponding to the first frequency. The first RF path may include, for example, at least a part of the first antenna 731, the RFFE 730, and the RFIC 720 which are configured for processing of the first frequency. The communication processor 710 may identify a target power corresponding to the first frequency. In a case where the communication processor 710 transmits an SRS, for example, a target power which is the magnitude of an RF signal input to an antenna port of the first antenna 731 may be identified to be the smaller one between a transmission magnitude identified based on Equation 1, or the maximum power configured for the electronic device 101. The communication processor 710 may control the RFIC 720 and/or the RFFE 730 such that an RF signal having the identified target power is applied to the first antenna 731. For example, the communication processor 710 may also control the RFIC 720 and/or the RFFE 730 such that an RF signal having a target power identified reflecting an RF path loss is applied to an antenna port corresponding to the first antenna 731. However, the disclosure is not limited thereto.

According to various embodiments, the communication processor 710 may identify the magnitude of an RF signal while the RF signal is input to the antenna port corresponding to the first antenna 731. For example, the communication processor 710 may identify the magnitude of an RF signal, which is measured by the FBRX 733. The communication processor 710 may identify that an error has occurred in the first RF path, for example, at least one of the RFIC 720, the RFFE 730, or the first antenna 731, based on a determined magnitude, for example, the difference between the target power and the measured magnitude.

The electronic device 101 according to various embodiments may perform at least one operation for using a different RF path when it is identified that an error has occurred in the first RF path, for example, at least one of the RFIC 720, the RFFE 730, or the first antenna 731, and this will be described in greater detail below. In an example, the communication processor 710 may use a different RF path corresponding to the identified first frequency, for example, the second antenna 732. If there is no different RF path corresponding to the first frequency, the communication processor 710 may use an RF path corresponding to a different available frequency. The electronic device 101 may be configured to use a different RAT (or a different core network) if there is no different available frequency. For example, based on identification that it is impossible to use the RFFE 730 for NR (or 5GC), the communication processor 710 may select an RF path corresponding to the RFFE 740 for E-UTRA (or EPC) which is a different RAT. In an embodiment, the electronic device 101 may also identify an error of the first RF path while performing or attempting to perform diversity-based communication using the first RF path and at least one different RF path. The electronic device 101 may stop using the first RF path, and may be configured to use the at least one different RF path.

Figure 8:
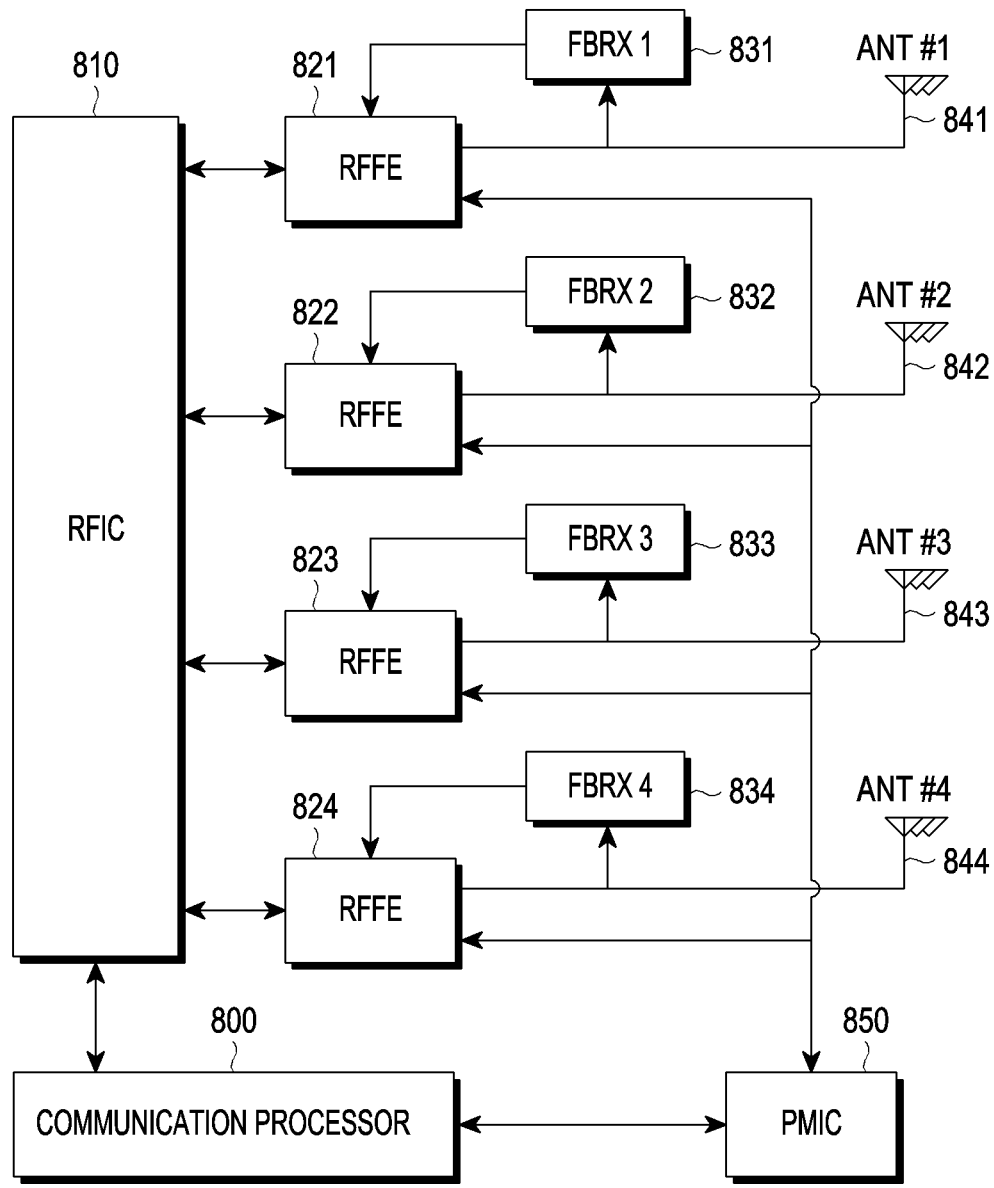
FIG. 8 is a block diagram illustrating an example configuration of an electronic device according to various embodiments.

FIG. 8 is a block diagram illustrating an example configuration of an electronic device according to various embodiments.

According to various embodiments, the electronic device 101 may include at least one of a communication processor (e.g., including processing circuitry) 800, an RFIC 810, RFFEs 821, 822, 823, and 824, FBRXs 831, 832, 833, and 834, antenna arrays 841, 842, 843, and 844, and/or a PMIC 850. The communication processor 800 may include at least one of, for example, the processor 120, the first communication processor 212, the second communication processor 214, or the integrated communication processor 260. The communication processor 800 illustrated in FIG. 8 may support, for example, a FR2 frequency of 5G communication. The RFIC 810 may include, for example, the third RFIC 226 and/or the fourth RFIC 228. The RFFEs 821, 822, 823, and 824 may include, for example, the third RFFE 236. Each of the RFFEs 821, 822, 823, and 824 may include, for example, a phase shifter for shifting the phase of an RF signal applied to antennas of each of the antenna arrays 841, 842, 843, and 844. The PMIC 850 may provide power to, for example, the RFFEs 821, 822, 823, and 824.

According to various embodiments, the communication processor 800 may select a first frequency and identify a first RF path corresponding to the first frequency. For example, the first antenna array 841 and the second antenna array 842 may be managed to be available with respect to the first frequency. The communication processor 800 may include, for example, at least a part of the first antenna array 841, the RFFE 821, and the RFIC 810 configured for processing of the first frequency. The communication processor 800 may identify a target power corresponding to the first frequency. In a case where the communication processor 710 transmits an SRS, for example, a target power which is the magnitude of an RF signal input to at least one antenna port of the first antenna array 841 may be identified to be the smaller one between a transmission magnitude identified based on Equation 1, or the maximum power configured for the electronic device 101. The communication processor 800 may control the RFIC 810 and/or the RFFE 821 such that an RF signal having the identified target power is applied to the first antenna array 841. For example, the communication processor 800 may also control the RFIC 810 and/or the RFFE 821 such that an RF signal having a target power identified reflecting an RF path loss is applied to at least one antenna port corresponding to the first antenna array 841. However, the disclosure is not limited thereto.

According to various embodiments, the communication processor 800 may identify the magnitude of an RF signal while the RF signal is input to the antenna port corresponding to the first antenna array 841. For example, the communication processor 800 may identify the magnitude of an RF signal, which is measured by the FBRX 831. The communication processor 800 may identify that an error has occurred in the first RF path, for example, at least one of the RFIC 810, the RFFE 821, or the first antenna array 841, based on a determined magnitude, for example, the difference between the target power and the measured magnitude.

The electronic device 101 according to various embodiments may perform at least one operation for using a different RF path when it is identified that an error has occurred in the first RF path, for example, at least one of the RFIC 810, the RFFE 821, or the first antenna array 841, and this will be described in greater detail below. In an example, the communication processor 800 may use a different RF path corresponding to the identified first frequency, for example, the second antenna array 842. If there is no different RF path corresponding to the first frequency, the communication processor 800 may use an RF path corresponding to a different available frequency. The electronic device 101 may be configured to use FR1 communication or use a different RAT (or a different core network) if there is no different available frequency.

Figure 9:
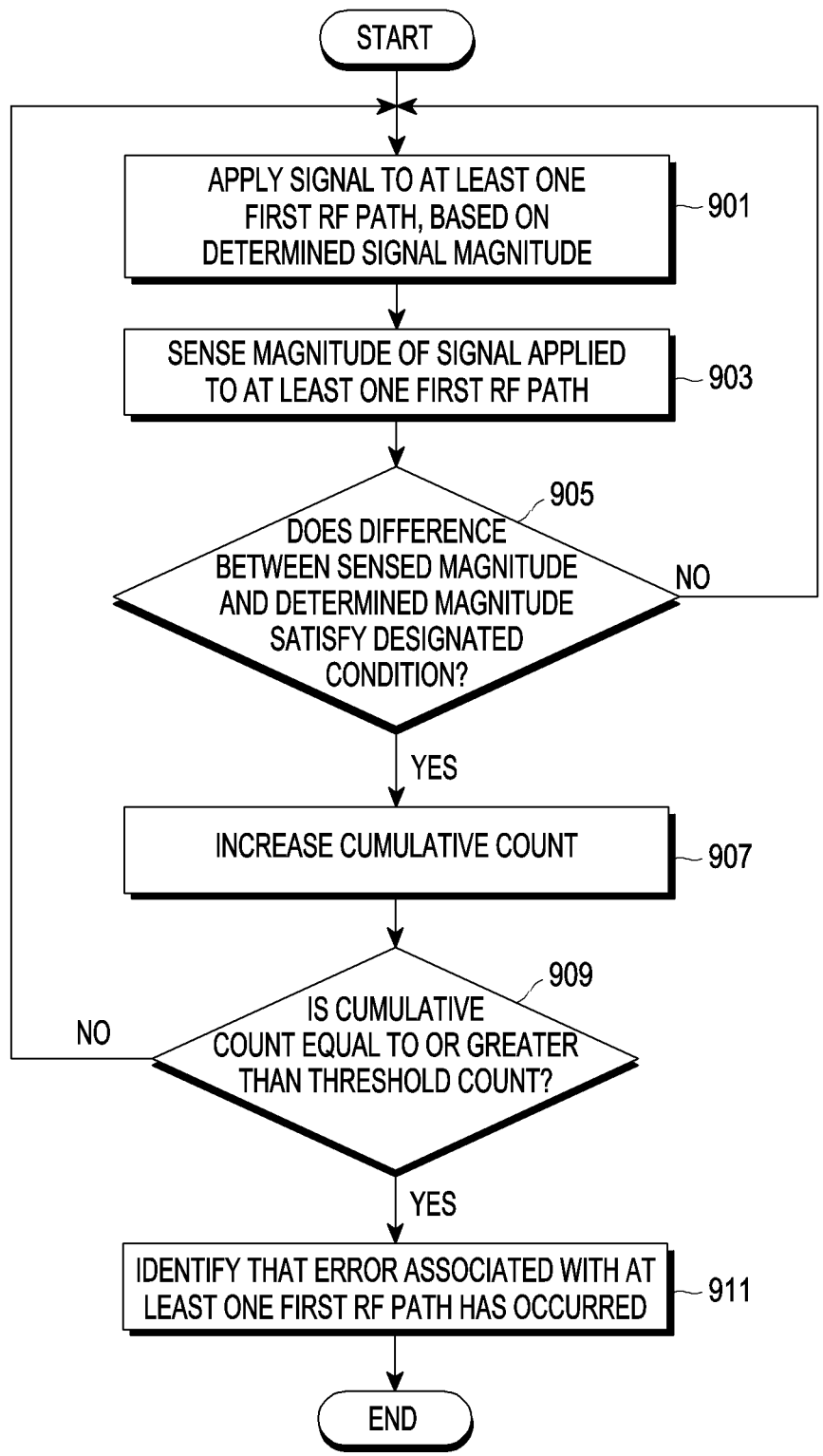
FIG. 9 is a flowchart illustrating an example method of operating an electronic device according to various embodiments.

FIG. 9 is a flowchart illustrating an example method of operating an electronic device according to various embodiments.

According to various embodiments, the electronic device 101 (e.g., at least one of the processor 120, the first communication processor 212, the second communication processor 214, or the integrated communication processor 260) may apply a signal to at least one first RF path, based on a determined signal magnitude in operation 901. As described above, the electronic device 101 may identify a target power of a particular channel (or signal). The electronic device 101 may control at least one RF device such that an RF signal having the identified target power is input to an antenna port. In operation 903, the electronic device 101 may sense the magnitude of a signal applied to the at least one first RF path. In operation 905, the electronic device 101 may identify whether the difference between the sensed magnitude and the determined magnitude satisfies a designated condition. As described above, the designated condition may indicate, for example, that the difference between the sensed magnitude and the determined magnitude is equal to or greater than a threshold value, but the disclosure is not limited thereto.

According to various embodiments, in a case where the designated condition is not satisfied (operation 905-No), the electronic device 101 may maintain application of a signal to the at least one first RF path, based on that an error does not occur in the corresponding RF path, and based on the determined signal magnitude. As described above, the magnitude of a particular channel (or signal) may be changed. The electronic device 101 may consistently identify whether the designated condition is satisfied. In a case where the designated condition is satisfied (operation 905-Yes), the electronic device 101 may increase a cumulative count in operation 907. In operation 909, the electronic device 101 may identify whether the cumulative count is equal to or greater than a threshold count. When it is identified that the cumulative count is equal to or greater than the threshold count (operation 909-Yes), the electronic device 101 may, in operation 911, identify that an error associated with the at least one first RF path has occurred. When it is identified that the cumulative count is not equal to or greater than the threshold count (operation 909-Yes), the electronic device 101 may maintain application of a signal to the at least one first RF path, based on that an error does not occur in the corresponding RF path, and based on the determined signal magnitude. As described above, the magnitude of a particular channel (or signal) may be changed. The electronic device 101 may consistently identify whether the designated condition is satisfied. The electronic device 101 may also be configured to identify error occurrence in a case where the condition is satisfied at least one time, as described above with reference to FIG. 6, or may also be configured to identify error occurrence in a case where the number of times the condition is satisfied is equal to or greater than a threshold count, or the number of times the condition is satisfied is consecutively equal to or greater than a threshold count, as illustrated in FIG. 9. According to the embodiment of FIG. 9, the use of a corresponding RF path can be prevented from being stopped based on the condition being temporarily satisfied due to a different cause than an error of an RF device.

Figure 10:
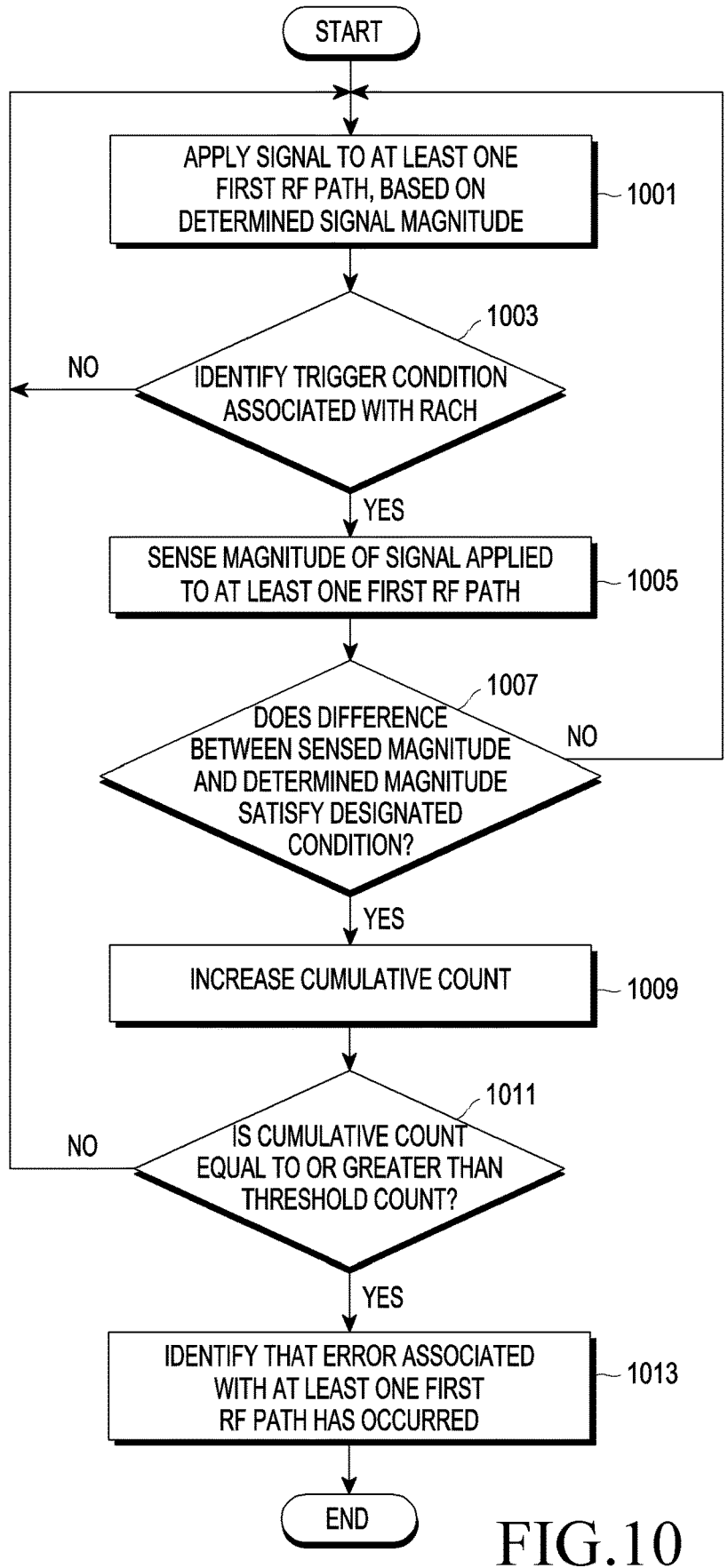
FIG. 10 is a flowchart illustrating an example method of operating an electronic device according to various embodiments.

FIG. 10 is a flowchart illustrating an example method of operating an electronic device according to various embodiments.

According to various embodiments, the electronic device 101 (e.g., at least one of the processor 120, the first communication processor 212, the second communication processor 214, or the integrated communication processor 260) may apply a signal to at least one first RF path, based on a determined signal magnitude in operation 1001. As described above, the electronic device 101 may identify a target power of a particular channel (or signal). The electronic device 101 may control at least one RF device such that an RF signal having the identified target power is input to an antenna port.

According to various embodiments, in operation 1003, the electronic device 101 may identify whether a trigger condition associated with an RACH is identified. In an example, the electronic device 101 may identify, as the RACH-associated trigger condition, a failure of an RACH procedure for initial network access in an RRC_IDLE state. For example, the electronic device 101 may transmit an RACH preamble, and identify that the RACH-associated trigger condition is identified, based on failing to receive a random access response corresponding to the RACH preamble. For example, the electronic device 101 may transmit an RRCConnectionRequest, based on reception of a random access response, and identify that the RACH-associated trigger condition is identified, based on failing to receive an RRCConnectionSetup corresponding to the RRCConnectionRequest. In an example, the electronic device 101 may identify that the RACH-associated trigger condition is identified, based on failing in RRC connection re-establishment in an RRC-connected state. In an example, the electronic device 101 may identify that the RACH-associated trigger condition is identified, based on failing in a handover. In an example, in a case where an uplink synchronization status is a non-synchronized state, when DL data or UL data is received in an RRC-connected state, for example, an RRC connection reconfiguration fails, the electronic device 101 may identify that the RACH-associated trigger condition is identified. In an example, the electronic device 101 may identify that the RACH-associated trigger condition is identified, based on failing in a beam failure recovery. In an example, the electronic device 101 may determine a power level (e.g., a high power state or a low power state) of a power amplifier (PA) for message transmission during an RACH procedure, and identify that the RACH-associated trigger condition is identified, based on failing in message transmission and/or response message reception in the corresponding state.

According to various embodiments, in a case where the RACH-associated trigger condition is not identified (operation 1003-No), the electronic device 101 may maintain application of a signal to the at least one first RF path, based on that an error does not occur in the corresponding RF path, and based on the determined signal magnitude. As described above, the magnitude of a particular channel (or signal) may be changed. The electronic device 101 may consistently identify whether the designated condition is satisfied. According to various embodiments, in a case where the RACH-associated trigger condition is identified (operation 1003-Yes), the electronic device 101 may, in operation 1005, sense the magnitude of a signal applied to the at least one first RF path. In operation 1007, the electronic device 101 may identify whether the difference between the sensed magnitude and the determined magnitude satisfies a designated condition.

According to various embodiments, in a case where the designated condition is not satisfied (operation 1007-No), the electronic device 101 may maintain application of a signal to the at least one first RF path, based on that an error does not occur in the corresponding RF path, and based on the determined signal magnitude. In a case where the designated condition is satisfied (operation 1007-Yes), the electronic device 101 may increase a cumulative count in operation 1009. In operation 1011, the electronic device 101 may identify whether the cumulative count is equal to or greater than a threshold count. When it is identified that the cumulative count is equal to or greater than the threshold count (operation 1011-Yes), the electronic device 101 may, in operation 1013, identify that an error associated with the at least one first RF path has occurred. When it is identified that the cumulative count is not equal to or greater than the threshold count (operation 1011-No), the electronic device 101 may maintain application of a signal to the at least one first RF path, based on that an error does not occur in the corresponding RF path, and based on the determined signal magnitude.

Figure 11:
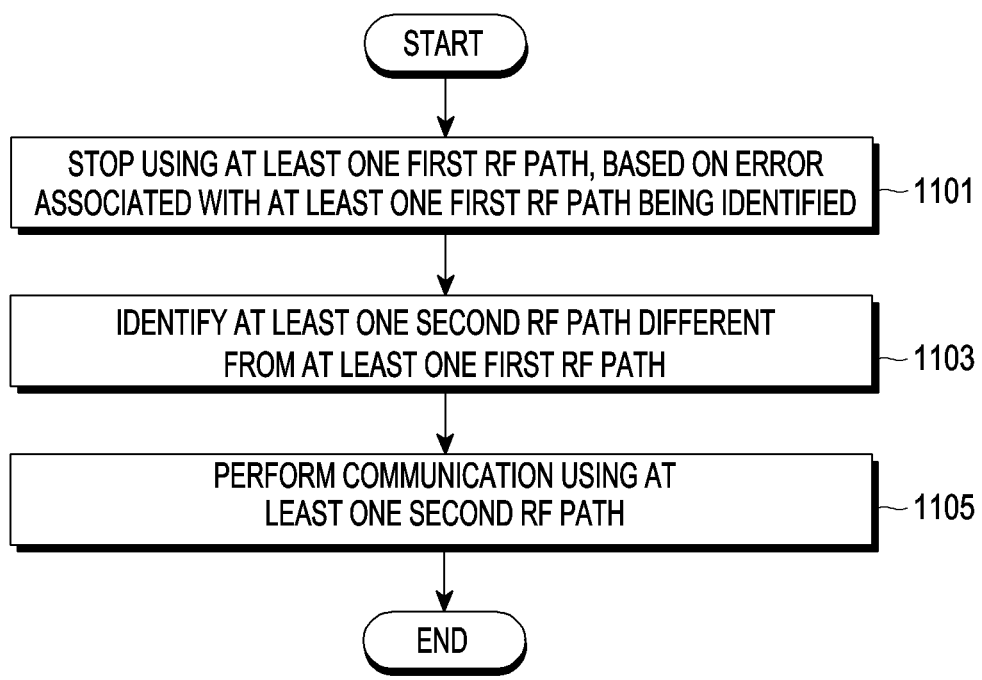
FIG. 11 is a flowchart illustrating an example method of operating an electronic device according to various embodiments.

FIG. 11 is a flowchart illustrating an example method of operating an electronic device according to various embodiments.

According to various embodiments, the electronic device 101 (e.g., at least one of the processor 120, the first communication processor 212, the second communication processor 214, or the integrated communication processor 260) may, in operation 1101, stop using at least one first RF path, based on an error associated with the at least one first RF path being identified. As described above, the electronic device 101 may identify an error associated with the at least one first RF path, based on failing to identify a response from an RF device associated with the first RF path, and/or based on that the difference between a predicted signal magnitude of the first RF path, and a measured signal magnitude satisfies a designated condition. After the error identification, the electronic device 101 may stop using the at least one first RF path.

According to various embodiments, the electronic device 101 may, in operation 1103, identify at least one second RF path different from the at least one first RF path. The electronic device 101 may perform communication using the at least one second RF path in operation 1105. For example, in a case where there is at least one second RF path in which a first frequency is available, the electronic device 101 may select the corresponding RF path to perform communication. For example, it may also be identified that there is no at least RF path capable of using the first frequency. The electronic device 101 may identify a frequency not using at least one first RF path, and may perform at least one operation for using the corresponding frequency. For example, the electronic device 101 may use a different RAT (or a different core network) to use at least one second RF path different from the at least one first RF path.

Figure 12:
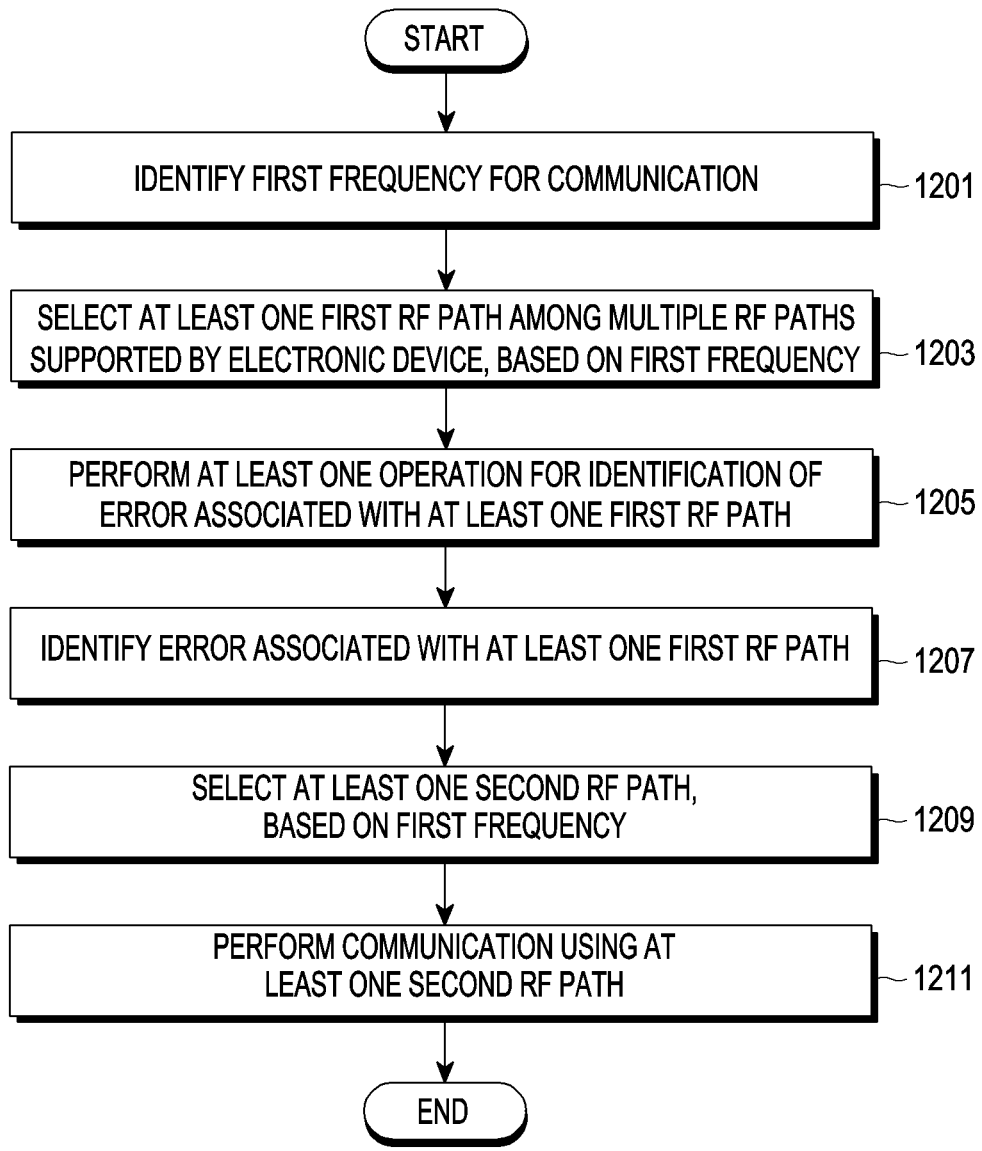
FIG. 12 is a flowchart illustrating an example method of operating an electronic device according to various embodiments.

FIG. 12 is a flowchart illustrating an example method of operating an electronic device according to various embodiments.

According to various embodiments, the electronic device 101 (e.g., at least one of the processor 120, the first communication processor 212, the second communication processor 214, or the integrated communication processor 260) may identify a first frequency for communication in operation 1201. The identification of the first frequency has been described above, and thus a detailed description thereof is omitted. In operation 1203, the electronic device 101 may select at least one first RF path among multiple RF paths supported by the electronic device 101, based on the first frequency. For example, the electronic device 101 may select a first RF path corresponding to the identified first frequency using association information as shown in Table 2.

TABLE 2

| Frequency band | RF resource (e.g., antenna) |
|---|---|
| Low band (e.g., 5, 8, or 20) | M1, S1 |
| Mid band (1, 2, 3, or 4) | M1, S1, M2, S2 |
| High band (7, 38, 39, 40, or 41) | M2, S2, M3, S4 |
| Ultra-high band (78 or 79) | M3, M4, S3, S5 |

Referring to Table 2, for example, a communication signal within band 5, 8, or 20 included in low bands may be transmitted or received through an M1 antenna or an S1 antenna. For example, a communication signal within band 1, 2, 3, or 4 included in mid bands may be transmitted or received through the M1 antenna, an M2 antenna, the S1 antenna, or an S2 antenna. A communication signal within band 7, 38, 39, 40, or 41 included in high bands may be transmitted or received through the M2 antenna, an M3 antenna, the S2 antenna, or an S4 antenna. A communication signal within band 78 or 79 included in ultra-high bands may be transmitted or received through the M3 antenna, an M4 antenna, an S3 antenna, or an S5 antenna. For example, in a case of selecting band 7 of high bands, the electronic device 101 may select the M2 antenna corresponding to band 7 using association information as shown in Table 2.

According to various embodiments, the electronic device 101 may, in operation 1205, perform at least one operation for identification of an error associated with the at least one first RF path. For example, the electronic device 101 may identify whether an error associated with the at least one first RF path has occurred, based on whether a response from an RF device associated with the at least one first RF path is identified, and/or based on whether the difference between a predicted signal magnitude corresponding to the at least one first RF path, and a measured signal magnitude satisfies a designated condition. In operation 1207, the electronic device 101 may identify an error associated with the at least one first RF path. For example, the electronic device 101 may identify an error associated with the at least one first RF path, based on failing to identify a response from an RF device associated with the at least one first RF path, and/or based on that the difference between a predicted signal magnitude corresponding to the at least one first RF path, and a measured signal magnitude satisfies a designated condition.

According to various embodiments, the electronic device 101 may, in operation 1209, select at least one second RF path, based on the first frequency. The electronic device 101 may perform communication using the at least one second RF path in operation 1211. For example, the electronic device 101 may manage, as an RF path in which the first frequency is available, a different RF path (e.g., a second RF path) in addition to the first RF path. For example, the electronic device 101 may identify, using association information as shown in Table 2, that there is also an M3 antenna other than the M2 antenna as an antenna corresponding to band 7, which is a high band. The electronic device 101 may perform communication using the M3 antenna so as to correspond to the corresponding frequency.

Figure 13:
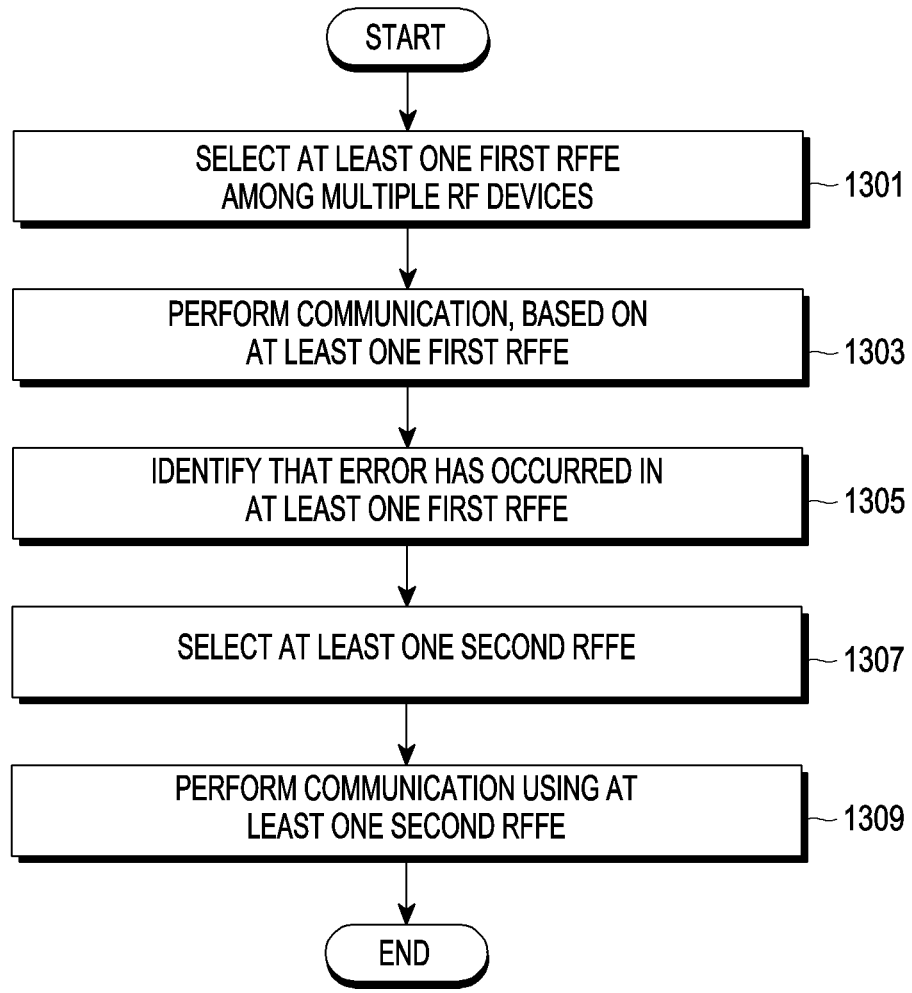
FIG. 13 is a flowchart illustrating an example method of operating an electronic device according to various embodiments.

FIG. 13 is a flowchart illustrating an example method of operating an electronic device according to various embodiments.

According to various embodiments, the electronic device 101 (e.g., at least one of the processor 120, the first communication processor 212, the second communication processor 214, or the integrated communication processor 260) may select at least one first RFFE among multiple RF devices in operation 1301. For example, in an embodiment of FIG. 13, it is presumed that the electronic device 101 selects a frequency included in FR2 to perform mmWave communication. Multiple phase shifters for adjustment of a beam steering direction, based on mmWave communication may be included in the selected at least one first RFFE. The electronic device 101 may perform communication, based on the at least one first RFFE in operation 1303. For example, the electronic device 101 may control a phase shift degree of each of the phase shifters included in the at least one first RFFE, based on an index of a selected transmission beam. The electronic device 101 may identify a target power of at least one antenna port of an antenna array corresponding to the at least one first RFFE, and may control an RFIC and/or the at least one first RFFE such that an RF signal having the target power is input to the at least one antenna port. According to various embodiments, the electronic device 101 may, in operation 1305, identify that an error has occurred in the at least one first RFFE. For example, the electronic device 101 may request a response from the at least one RFFE, and if the electronic device fails to receive a response from the at least one RFFE, the electronic device 101 may identify that an error has occurred in the at least one first RFFE. For example, the electronic device 101 may measure the magnitude of a signal at the at least one antenna port of the antenna array corresponding to the at least one first RFFE. The electronic device 101 may identify the difference between a predicted magnitude (e.g., the target power) and the measured magnitude, and in a case where the identified difference satisfies a designated condition, the electronic device may identify that an error has occurred in the at least one first RFFE.

According to various embodiments, the electronic device 101 may, in operation 1307, select at least one second RFFE. The electronic device 101 may perform communication using the at least one second RFFE in operation 1309. For example, the electronic device 101 may control a phase shift degree of each of phase shifters included in the at least one second RFFE, based on an index of a selected transmission beam. The electronic device 101 may identify a target power of at least one antenna port of an antenna array corresponding to the at least one second RFFE, and may control an RFIC and/or the at least one second RFFE such that an RF signal having the target power is input to the at least one antenna port. Accordingly, the electronic device 101 may stop using the RFFE in which an error has occurred, and may perform mmWave communication using the RFFE in which an error has not occurred.

Figure 14:
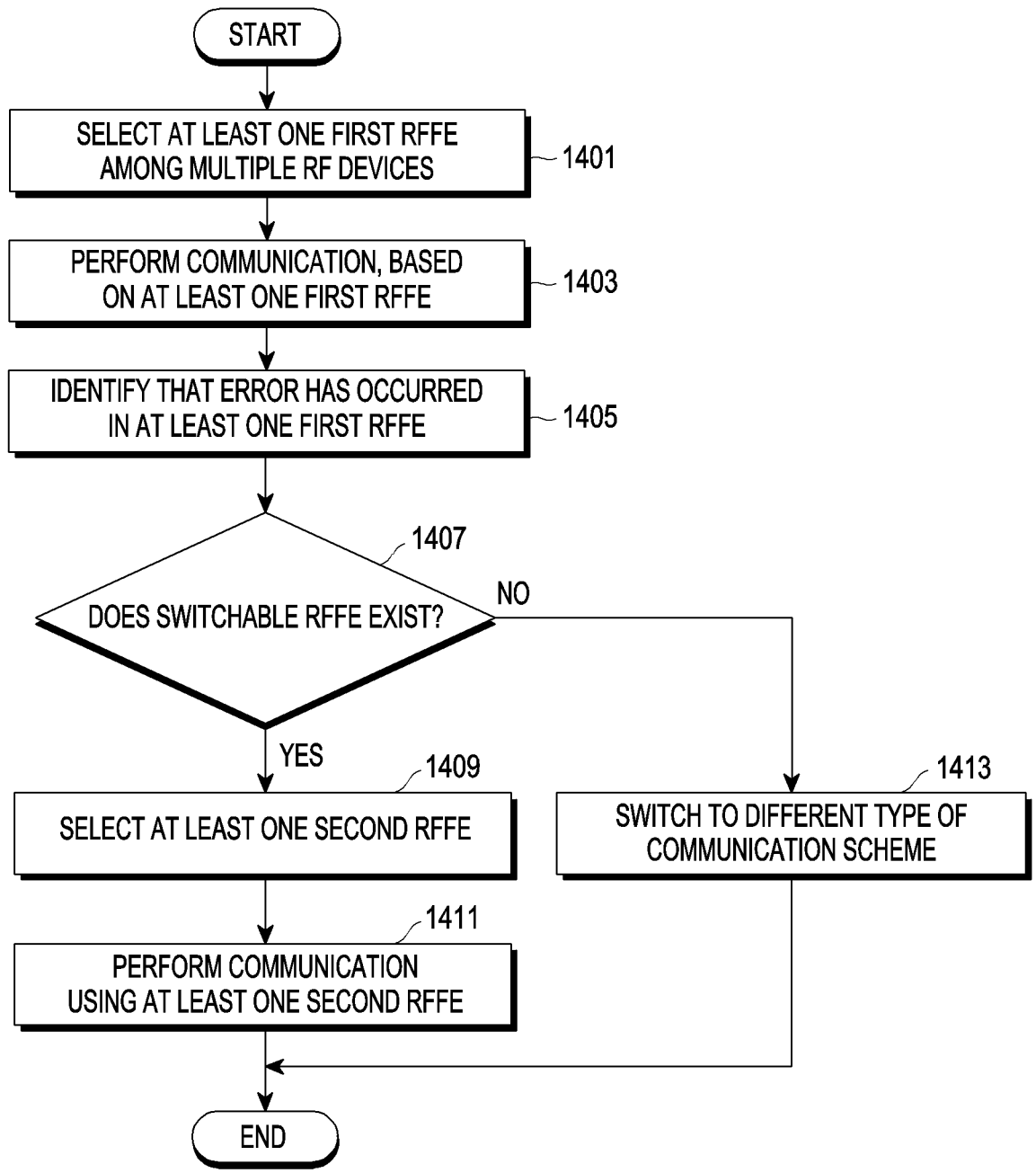
FIG. 14 is a flowchart illustrating an example method of operating an electronic device according to various embodiments.

FIG. 14 is a flowchart illustrating an example method of operating an electronic device according to various embodiments.

According to various embodiments, the electronic device 101 (e.g., at least one of the processor 120, the first communication processor 212, the second communication processor 214, or the integrated communication processor 260) may select at least one first RFFE among multiple RF devices in operation 1401. For example, in an embodiment of FIG. 14, it is presumed that the electronic device 101 selects a frequency included in FR2 to perform mmWave communication. For example, the electronic device 101 may control a phase shift degree of each of phase shifters included in the at least one first RFFE, based on an index of a selected transmission beam. The electronic device 101 may identify a target power of at least one antenna port of an antenna array corresponding to the at least one first RFFE, and may control an RFIC and/or the at least one first RFFE such that an RF signal having the target power is input to the at least one antenna port. The electronic device 101 may perform communication, based on the at least one first RFFE in operation 1403.

According to various embodiments, the electronic device 101 may, in operation 1405, identify that an error has occurred in the at least one first RFFE. For example, the electronic device 101 may request a response from the at least one RFFE, and if the electronic device fails to receive a response from the at least one RFFE, the electronic device 101 may identify that an error has occurred in the at least one first RFFE. For example, the electronic device 101 may measure the magnitude of a signal at the at least one antenna port of the antenna array corresponding to the at least one first RFFE. The electronic device 101 may identify the difference between a predicted magnitude (e.g., the target power) and the measured magnitude, and in a case where the identified difference satisfies a designated condition, the electronic device may identify that an error has occurred in the at least one first RFFE.

According to various embodiments, the electronic device 101 may identify whether a switchable RFFE exists, in operation 1407. For example, the electronic device 101 may be implemented to include multiple RFFEs, and may determine whether there is a different RFFE for performing mmWave communication than the first RFFE. In a case where there is a switchable (or replaceable) RFFE (operation 1407-Yes), the electronic device 101 may, in operation 1409, select at least one second RFFE. In operation 1411, the electronic device 101 may perform communication using the at least one second RFFE. In a case where there is no switchable RFFE (operation 1407-No), the electronic device 101 may, in operation 1413, switch to a different type of communication scheme. For example, the electronic device 101 may select a frequency included in FR1 to use a CN (for example, 5GC) and an RAT (e.g., NR) of FR1 so as to perform communication. The electronic device 101 may select an RF path corresponding to a frequency included in FR1, and perform communication, based on the selected RF path. For example, the electronic device 101 may also perform system fallback (e.g., EPS fallback) (or RAT fallback (e.g., E-UTRA fallback) or CN fallback (e.g., EPC fallback)). The electronic device 101 may, after fallback, select an RF path corresponding to a fallback system (or RAT or CN), and perform communication, based on the selected RF path.

Figure 15:
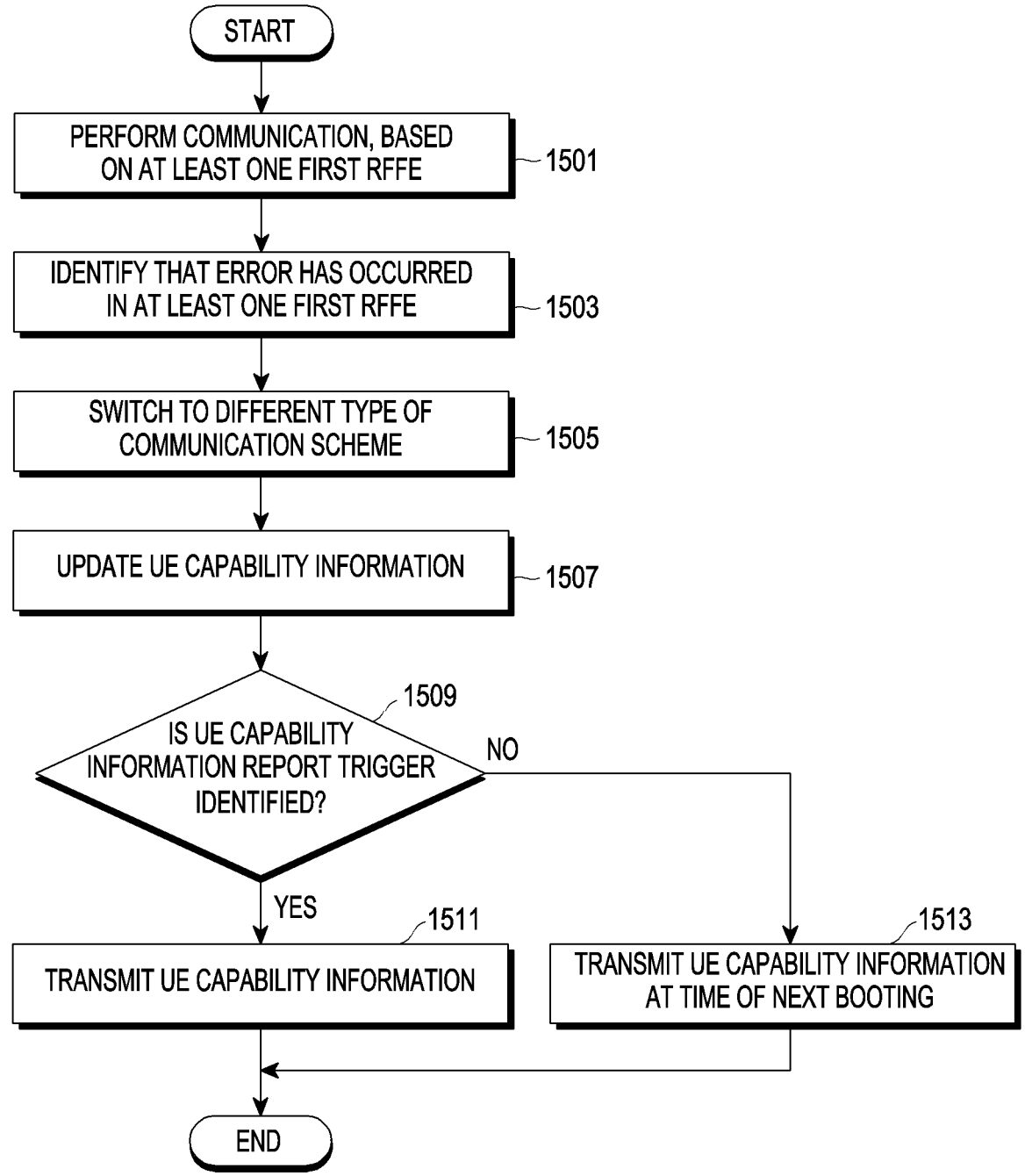
FIG. 15 is a flowchart illustrating an example method of operating an electronic device according to various embodiments.

FIG. 15 is a flowchart illustrating an example method of operating an electronic device according to various embodiments.

According to various embodiments, the electronic device 101 (e.g., at least one of the processor 120, the first communication processor 212, the second communication processor 214, or the integrated communication processor 260) may select at least one first RFFE among multiple RF devices and perform communication based on the selected at least one first RFFE in operation 1501. For example, in an embodiment of FIG. 15, it is presumed that the electronic device 101 selects a frequency included in FR2 to perform mmWave communication. For example, the electronic device 101 may control a phase shift degree of each of phase shifters included in the at least one first RFFE, based on an index of a selected transmission beam. The electronic device 101 may identify a target power of at least one antenna port of an antenna array corresponding to the at least one first RFFE, and may control an RFIC and/or the at least one first RFFE such that an RF signal having the target power is input to the at least one antenna port. The electronic device 101 may perform communication, based on the at least one first RFFE. In operation 1503, the electronic device 101 may identify that an error has occurred in the at least one first RFFE. In operation 1505, the electronic device 101 may switch to a different type of communication scheme. For example, as described with reference to FIG. 14, the electronic device 101 may perform communication, based on a frequency included in FR1, or may perform system fallback (e.g., EPS fallback).

According to various embodiments, the electronic device 101 may, in operation 1507, update UE capability information. For example, the electronic device 101 may remove information indicating that a frequency of FR2 is supported, which is included in the UE capability information. For example, the electronic device 101 may remove an entry of a band combination including at least a frequency malfunctioning in FR2 among candidate band combinations in the UE capability information. The electronic device 101 may identify whether a trigger to report the UE capability information is identified, in operation 1509. For example, the electronic device 101 may identify whether a trigger by which the UE capability information is requested, as a tracking area update (TAU) request, has been occurred from a network. In a case where a trigger to report the UE capability information is identified (operation 1509-Yes), the electronic device 101 may transmit the UE capability information in operation 1511. In a case where a trigger to report the UE capability information is not identified (operation 1509-No), the electronic device 101 may delay reporting of the UE capability information, and may transmit the UE capability information in operation 1513 at the time of next booting. The booting may be executed by a user, or may be executed through base station signaling performed by a separate server which monitors and manages a failure.

Figure 16:
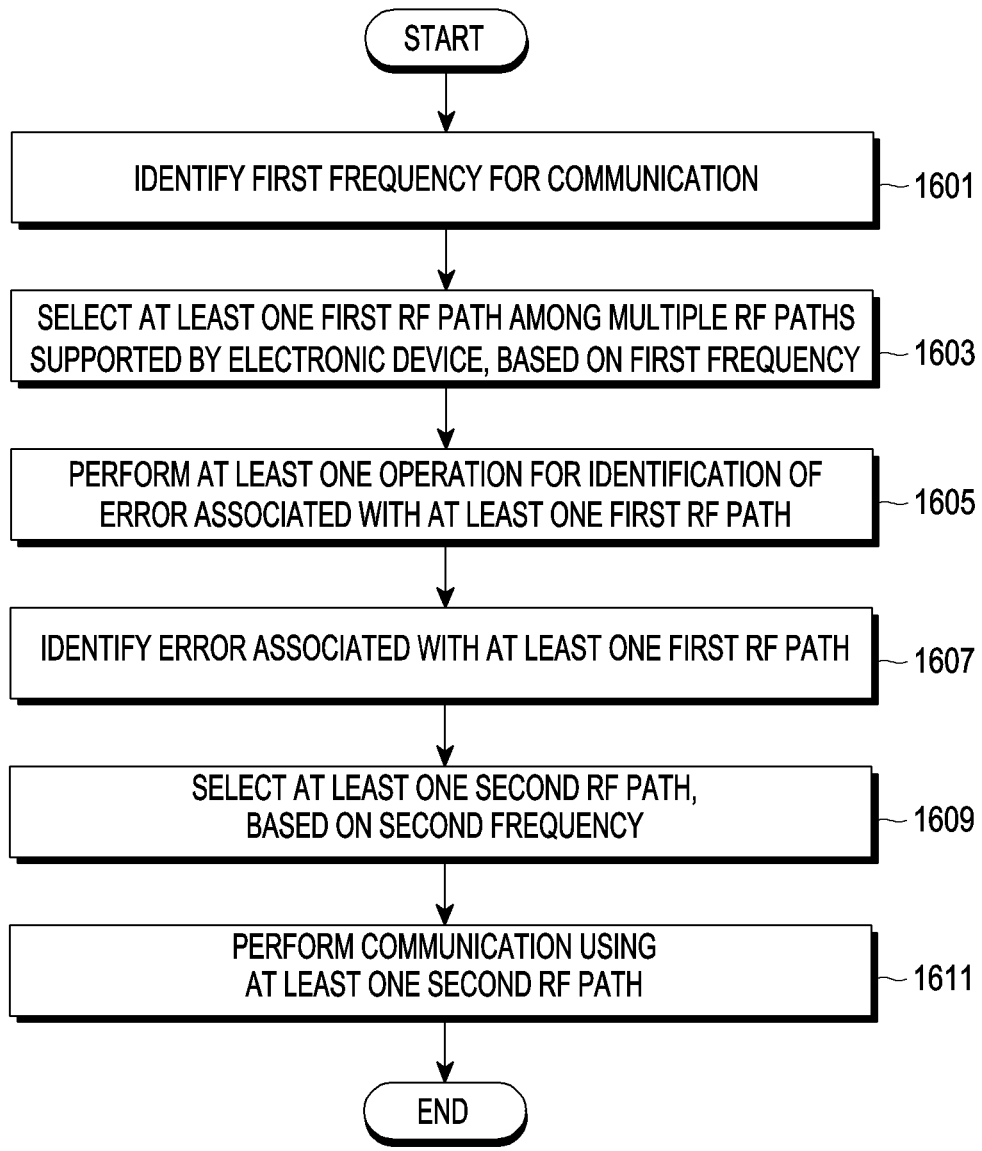
FIG. 16 is a flowchart illustrating an example method of operating an electronic device according to various embodiments.

FIG. 16 is a flowchart illustrating an example method of operating an electronic device according to various embodiments.

According to various embodiments, the electronic device 101 (e.g., at least one of the processor 120, the first communication processor 212, the second communication processor 214, or the integrated communication processor 260) may identify a first frequency for communication in operation 1601. The identification of the first frequency has been described above, and thus a detailed description thereof is omitted. In operation 1603, the electronic device 101 may select at least one first RF path among multiple RF paths supported by the electronic device 101, based on the first frequency. For example, the electronic device 101 may select a first RF path corresponding to the identified first frequency using association information as shown in Table 2. For example, in a case of selecting band 5 of low bands, the electronic device 101 may select an M1 antenna corresponding to band 5 using association information as shown in Table 2.

According to various embodiments, the electronic device 101 may, in operation 1605, perform at least one operation for identification of an error associated with the at least one first RF path. For example, the electronic device 101 may identify whether an error associated with the at least one first RF path has occurred, based on whether a response from an RF device associated with the at least one first RF path is identified, and/or based on whether the difference between a predicted signal magnitude corresponding to the at least one first RF path, and a measured signal magnitude satisfies a designated condition. In operation 1607, the electronic device 101 may identify an error associated with the at least one first RF path. For example, the electronic device 101 may identify an error associated with the at least one first RF path, based on failing to identify a response from an RF device associated with the at least one first RF path, and/or based on that the difference between a predicted signal magnitude corresponding to the at least one first RF path, and a measured signal magnitude satisfies a designated condition.

According to various embodiments, the electronic device 101 may, in operation 1609, select at least one second RF path, based on a second frequency. The electronic device 101 may perform communication using the at least one second RF path in operation 1611. For example, the electronic device 101 may identify that there is no other RF path than the first RF path at the first frequency. The electronic device 101 may identify, based on association information as shown in Table 2, that there is no other RF resource than the M1 antenna corresponding to band 5. The electronic device 101 may select a second frequency different from the first frequency. The selected second frequency may be lower than or be slightly spaced apart from the first frequency. The electronic device 101 may select band 7 of high bands among frequencies not using the M1 antenna, based on, for example, association information as shown in Table 2. The electronic device 101 may select an M2 antenna corresponding to band 7. The electronic device 101 may also be configured to select a frequency not associated with an RF device in which an error has occurred.

Figure 17:
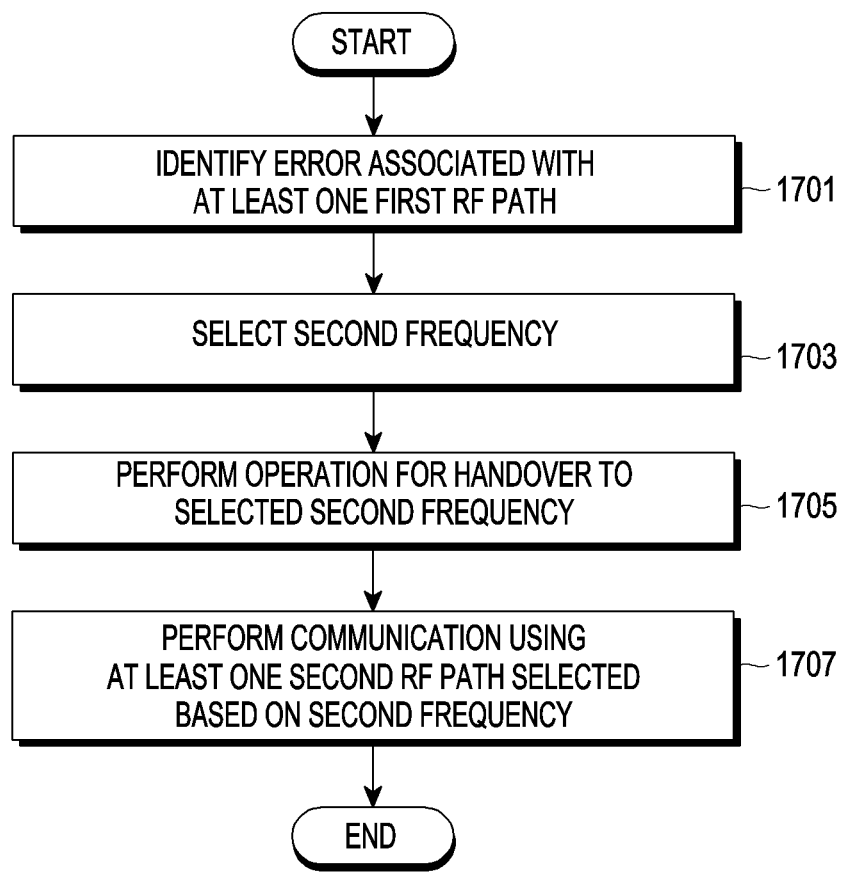
FIG. 17 is a flowchart illustrating an example method of operating an electronic device according to various embodiments.

FIG. 17 is a flowchart illustrating an example method of operating an electronic device according to various embodiments.

According to various embodiments, the electronic device 101 (e.g., at least one of the processor 120, the first communication processor 212, the second communication processor 214, or the integrated communication processor 260) may identify an error associated with at least one first RF path in operation 1701. For example, the electronic device 101 may identify an error associated with the at least one first RF path, based on failing to identify a response from an RF device associated with the at least one first RF path, and/or based on that the difference between a predicted signal magnitude corresponding to the at least one first RF path, and a measured signal magnitude satisfies a designated condition.

According to various embodiments, the electronic device 101 may, in operation 1703, select a second frequency, based on the identification of the error. The electronic device 101 may select a second frequency which is irrelevant to the at least one first RF path. In operation 1705, the electronic device 101 may perform an operation for a handover to the selected second frequency. For example, the electronic device 101 may receive an RRC Reconfiguration message (e.g., an RRC Connection Reconfiguration message of E-UTRA, or an RRC Reconfiguration message of NR) including a measurement object (MO) from a network, and may measure the magnitude of a reference signal (or a synchronization signal) from a serving cell and/or a neighboring cell, based on the received MO. For example, it is presumed that the serving cell corresponds to the first frequency, and the neighboring cell corresponds to the second frequency. The electronic device 101 may identify, based on a result of the measurement, whether a report condition (e.g., an A3 event) corresponding to an interfrequency handover and/or a report condition (e.g., a B1 event) corresponding to an inter-RAT handover is satisfied. In a case where the second frequency is selected, the electronic device 101 may perform a measurement report (MR) when an A3 event and/or a B2 event is satisfied and/or is not satisfied. For example, the electronic device 101 may configure a result of measurement of the serving cell to have a value equal to or less than that of an actual measurement result, and configure a result of measurement of the neighboring cell corresponding to the second frequency to have a value equal to or greater than that of an actual measurement result, and perform a measurement report, thereby inducing a handover to the neighboring cell corresponding to the second frequency. For example, the electronic device 101 may also process an RF device associated with reception of a signal having the first frequency such that the RF device has an error, and may perform control such that the magnitude of a signal having the first frequency is abnormally measured accordingly. As described above, the electronic device 101 may perform at least one operation for performing a measurement report in order to induce a handover to a cell corresponding to the second frequency, based on selection of the second frequency. The network may provide a handover command indicating, as a target cell, a cell corresponding to the second frequency to the electronic device 101, based on the measurement report. The electronic device 101 may perform a handover to the cell corresponding to the second frequency, based on the handover command. After an operation for a handover is performed, in operation 1707, the electronic device 101 may perform communication using at least one second RF path selected based on the second frequency.

Figure 18:
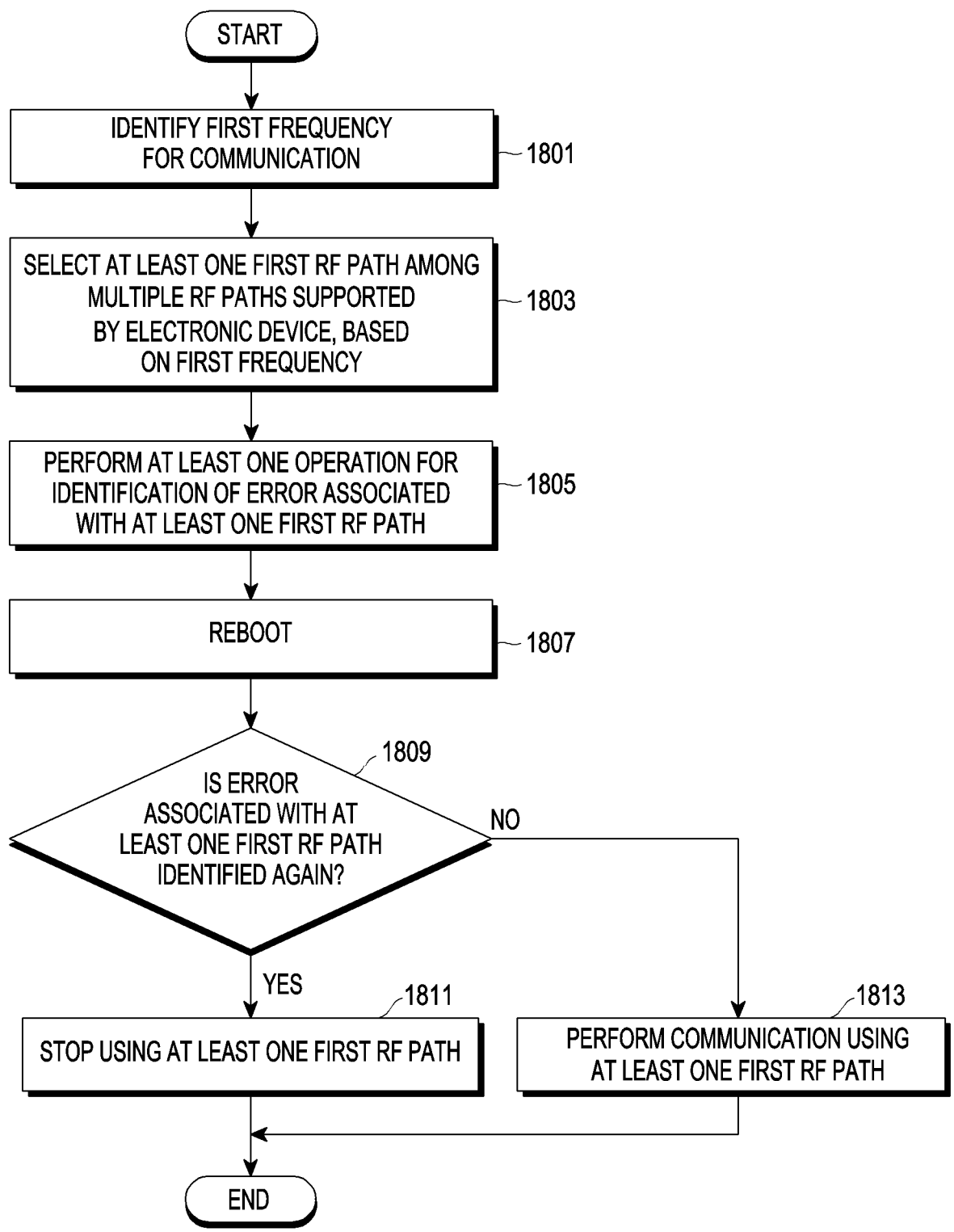
FIG. 18 is a flowchart illustrating an example method of operating an electronic device according to various embodiments.

FIG. 18 is a flowchart illustrating an example method of operating an electronic device according to various embodiments.

According to various embodiments, the electronic device 101 (e.g., at least one of the processor 120, the first communication processor 212, the second communication processor 214, or the integrated communication processor 260) may identify a first frequency for communication in operation 1801. The identification of the first frequency has been described above, and thus a detailed description thereof is omitted. In operation 1803, the electronic device 101 may select at least one first RF path among multiple RF paths supported by the electronic device 101, based on the first frequency. The electronic device 101 may, in operation 1805, perform at least one operation for identification of an error associated with the at least one first RF path. For example, the electronic device 101 may identify whether an error associated with the at least one first RF path has occurred, based on whether a response from an RF device associated with the at least one first RF path is identified, and/or based on whether the difference between a predicted signal magnitude corresponding to the at least one first RF path, and a measured signal magnitude satisfies a designated condition. The electronic device 101 may identify an error associated with the at least one first RF path.

According to various embodiments, the electronic device 101 may reboot in operation 1807. The electronic device 101 may determine whether an error associated with the at least one first RF path is identified again even after rebooting, in operation 1809. The electronic device 101 may perform at least one operation for identification of an error associated with the at least one first RF path. In a case where an error associated with the at least one first RF path is identified again (operation 1809-Yes), the electronic device 101 may, in operation 1811, stop using the at least one first RF path. The electronic device 101 may manage, as a genuine error, an error associated with the at least one first RF path, and may operate such that the at least one first RF path is not used later. In a case where an error associated with the at least one first RF path is not identified again (operation 1809-No), the electronic device 101 may, in operation 1813, perform communication using the at least one first RF path. For example, based on occurrence of a temporary error in the at least one first RF path, after the temporary error is corrected, the electronic device 101 may perform communication using the at least one first RF path.

According to various example embodiments, an electronic device may include: at least one antenna, and at least one processor, wherein the at least one processor is configured to: identify a first frequency for wireless communication through at least one of the at least one antenna, select, based on the first frequency, at least one first radio frequency (RF) path among multiple RF paths positioned between the at least one antenna and the processor, identify an error associated with the at least one first RF path, based on an error associated with the at least one first RF path being identified, stop using the at least one first RF path, and control a communication circuit positioned in at least one second RF path among the multiple RF paths such that a baseband signal is converted into an RF signal, wherein the RF signal is configured to be radiated outwards through at least one antenna corresponding to the at least one second RF path among the at least one antenna.

According to various example embodiments, the at least one processor may be configured to: as at least a part of the identifying of an error associated with the at least one first RF path, request a response from at least one communication circuit positioned in the at least one first RF path, and based on failing to identify a response corresponding to the request from at least some of the at least one communication circuit positioned in the at least one first RF path, identify an error associated with the at least one first RF path.

According to various example embodiments, the at least one processor may be configured to: as at least a part of the requesting of the response from the at least one communication circuit positioned in the at least one first RF path, request a manufacturer id (mid) and/or a product id (pid) of the at least one communication circuit positioned in the at least one first RF path through a mobile industry processor interface (MIPI) between the at least one processor and the at least one communication circuit positioned in the at least one first RF path.

According to various example embodiments, the at least one processor may be further configured to: determine a first magnitude of a signal corresponding to the at least one first RF path, and control at least some of at least one communication circuit positioned in the at least one first RF path such that the signal having the first magnitude is applied to the at least one first RF path.

According to various example embodiments, the at least one processor may be configured to: as at least a part of the identifying of an error associated with the at least one first RF path, identify a second magnitude of the signal measured at the at least one first RF path, and based on that a difference and/or a ratio between the first magnitude and the second magnitude satisfies a designated condition, identify an error associated with the at least one first RF path.

According to various example embodiments, the at least one processor may be configured to: as at least a part of the identifying of an error associated with the at least one first RF path, based on that the difference and/or the ratio between the first magnitude and the second magnitude satisfies the designated condition, identify an error associated with the at least one first RF path in a case where the number of times the difference and/or the ratio satisfies the designated condition is equal to or greater than a threshold number, or in a case where the number of times the condition is satisfied is consecutively equal to or greater than a threshold count.

According to various example embodiments, the at least one processor may be configured to: as at least a part of the identifying of an error associated with the at least one first RF path, perform at least one operation for identification of an error associated with the at least one first RF path, based on identification of an RACH-associated trigger condition.

According to various example embodiments, the at least one processor may be further configured to: select the at least one second RF path corresponding to the first frequency, based on stopping of using the at least one first RF path.

According to various example embodiments, the at least one processor may be further configured to: select the at least one second RF path corresponding to a second frequency different from the first frequency, based on stopping of using the at least one first RF path.

According to various example embodiments, the at least one processor may be further configured to: perform a measurement report associated with the second frequency, receive a handover command associated with a target cell corresponding to the second frequency, the command being received from a network so as to correspond to the measurement report, and perform a handover to the target cell, based on the handover command.

According to various example embodiments, the at least one processor may be configured to: as at least a part of the performing of a measurement report associated with the second frequency, perform, based on that an error associated with the at least one first RF path is identified, the measurement report even in a case where a result of measuring a signal from a neighboring cell associated with the second frequency does not satisfy a report condition for a handover.

According to various example embodiments, the at least one processor may be configured to: as at least a part of the performing of a measurement report associated with the second frequency, perform, based on that an error associated with the at least one first RF path is identified, the measurement report including a first magnitude equal to or less than a measured magnitude of a signal from a serving cell corresponding to the first frequency, and/or a second magnitude equal to or greater than a measured magnitude of a signal from a neighboring cell corresponding to the second frequency.

According to various example embodiments, the at least one processor may be further configured to: stop using at least one first RFFE included in the at least one first RF path, based on stopping of using the at least one first RF path, and perform communication using at least one second RFFE different from the at least one first RFFE.

According to various example embodiments, the at least one processor may be further configured to: identify, based on stopping of using the at least one first RF path corresponding to the first frequency included in FR2, whether there is a different RF path corresponding to the first frequency included in the FR2, select a third frequency included in FR1 in a case where the different RF path corresponding to the first frequency included in the FR2 does not exist, and perform communication using at least one third RF path corresponding to the third frequency.

According to various example embodiments, the at least one processor may be further configured to: generate, by the electronic device, UE capability information not including the first frequency included in the FR2, and report the generated UE capability information to a network.

According to various example embodiments, the at least one processor may be further configured to: identify, based on stopping of using the at least one first RF path associated with a first communication system, whether there is a different RF path associated with the first communication system, perform system fallback to a second communication system in a case where the different RF path associated with the first communication system does not exist, and perform communication, based on the second communication system.

According to various example embodiments, the at least one processor may be further configured to: generate, by the electronic device, UE capability information not including the first communication system, and report the generated UE capability information to a network.

According to various example embodiments, the at least one processor may be configured to: as at least a part of the stopping of using the at least one first RF path, based on that an error associated with the at least one first RF path is identified, reboot the electronic device, based on that an error associated with the at least one first RF path is identified, and based on the rebooting, based on that an error associated with the at least one first RF path is identified again, stop using the at least one first RF path.

According to various example embodiments, the at least one processor may be further configured to: based on the rebooting, based on failing to identify an error associated with the at least one first RF path, perform communication using the at least one first RF path.

According to various example embodiments, a method of operating an electronic device including at least one antenna may include: identifying a first frequency for wireless communication through at least one of the at least one antenna, selecting, based on the first frequency, at least one first radio frequency (RF) path among multiple RF paths positioned between the at least one antenna and a processor, identifying an error associated with the at least one first RF path, based on an error associated with the at least one first RF path being identified, stopping using the at least one first RF path, and controlling a communication circuit positioned in at least one second RF path among the multiple RF paths such that a baseband signal is converted into an RF signal, wherein the RF signal is configured to be radiated outwards through at least one antenna corresponding to the at least one second RF path among the at least one antenna.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:
   at least one antenna; and
   at least one hardware processor,
   memory, wherein the memory stores instructions that, when executed by the at least one hardware processor, cause the electronic device to:
   select a first radio frequency front end (RFFE) among a plurality of radio frequency (RF) devices,
   perform a communication based on the selected first RFFE, wherein the communication is performed based on a first frequency included in a frequency range 2 (FR2) frequency band,
   identify that an error has occurred in the first RFFE,
   based on the error, select a second frequency included in the FR1 frequency band,
   perform the communication based on the second frequency included in the FR1 frequency band,
   update UE capability information by removing information indicating that a frequency of the FR2 frequency band is supported, and
   transmit the updated UE capability information to a base station.

2. The electronic device of claim 1, wherein the instructions that, when executed by the at least one hardware processor, cause the electronic device to:
   request a response from at least one communication circuit positioned in at least one first RF path including the first RFFE, and
   based on failing to identify a response corresponding to the request, from at least a part of the at least one communication circuit positioned in the at least one first RF path, identify the error associated with the at least one first RF path.

3. The electronic device of claim 2, wherein the instructions that, when executed by the at least one hardware processor, cause the electronic device to:
   request a manufacturer id (mid) or a product id (pid) of the at least one communication circuit positioned in the at least one first RF path through a mobile industry processor interface (MIPI) between the at least one processor and the at least one communication circuit positioned in the at least one first RF path.

4. The electronic device of claim 2, wherein the instructions that, when executed by the at least one hardware processor, cause the electronic device to:
  determine a first magnitude of a signal corresponding to the at least one first RF path, and
  control at least one of at least one communication circuit positioned in the at least one first RF path such that the signal having the first magnitude is applied to the at least one first RF path.

5. The electronic device of claim 4, wherein the instructions that, when executed by the at least one hardware processor, cause the electronic device to:
  identify a second magnitude of the signal measured at the at least one first RF path, and
  based on a difference or a ratio between the first magnitude and the second magnitude satisfying a designated condition, identify the error associated with the at least one first RF path.

6. The electronic device of claim 5, wherein the instructions that, when executed by the at least one hardware processor, cause the electronic device to:
  identify the error associated with the at least one first RF path where the number of times the difference or the ratio satisfies the designated condition is equal to or greater than a threshold number, or where the number of times the condition is satisfied is consecutively equal to or greater than a threshold count.

7. The electronic device of claim 2, wherein the instructions that, when executed by the at least one hardware processor, cause the electronic device to:
  perform at least one operation for identification of the error associated with the at least one first RF path, based on identification of an RACH-associated trigger condition.

8. The electronic device of claim 2, wherein the instructions that, when executed by the at least one hardware processor, cause the electronic device to:
  select at least one second RF path corresponding to the first frequency, based on stopping using the at least one first RF path.

9. The electronic device of claim 8, wherein the instructions that, when executed by the at least one hardware processor, cause the electronic device to:
  select the at least one second RF path corresponding to a second frequency different from the first frequency, based on stopping using the at least one first RF path.

10. The electronic device of claim 9, wherein the instructions that, when executed by the at least one hardware processor, cause the electronic device to:
  perform a measurement report associated with the second frequency,
  receive a handover command associated with a target cell corresponding to the second frequency, the command being received from a network to correspond to the measurement report, and
  perform a handover to the target cell, based on the handover command.

11. The electronic device of claim 10, wherein the instructions that, when executed by the at least one hardware processor, cause the electronic device to:
  perform, based on the error associated with the at least one first RF path being identified, the measurement report where a result of measuring a signal from a neighboring cell associated with the second frequency does not satisfy a report condition for a handover.

12. The electronic device of claim 10, wherein the instructions that, when executed by the at least one hardware processor, cause the electronic device to:
  perform, based on the error associated with the at least one first RF path being identified, the measurement report including a first magnitude equal to or less than a measured magnitude of a signal from a serving cell corresponding to the first frequency, or a second magnitude equal to or greater than a measured magnitude of a signal from a neighboring cell corresponding to the second frequency.

13. The electronic device of claim 2, wherein the instructions that, when executed by the at least one hardware processor, cause the electronic device to:
  based on stopping using the at least one first RF path associated with a first communication system, identify whether there is a different RF path associated with the first communication system,
  perform system fallback to a second communication system where the different RF path associated with the first communication system does not exist, and
  perform communication with a network, based on the second communication system.

14. The electronic device of claim 13, wherein the instructions that, when executed by the at least one hardware processor, cause the electronic device to:
  generate, by the electronic device, user equipment (UE) capability information not including the first communication system, and
  report the generated UE capability information to a network.

15. The electronic device of claim 2, wherein the instructions that, when executed by the at least one hardware processor, cause the electronic device to:
  reboot the electronic device, based on the error associated with the at least one first RF path being identified, and
  based on the rebooting, based on the error associated with the at least one first RF path being identified again, stop using the at least one first RF path.

16. The electronic device of claim 15, wherein the instructions that, when executed by the at least one hardware processor, cause the electronic device to:
  based on failing to identify the error associated with the at least one first RF path, perform communication using the at least one first RF path.

17. The electronic device of claim 1, wherein the instructions that, when executed by the at least one hardware processor, cause the electronic device to:
  stop using at least one first RFFE included in the at least one first RF path, based on stopping using the at least one first RF path, and
  perform communication using at least one second RFFE different from the at least one first RFFE.

18. A method, comprising:
  selecting a first radio frequency front end (RFFE) among a plurality of radio frequency (RF) devices,
  performing a communication based on the selected first RFFE, wherein the communication is performed based on a first frequency included in a frequency range 2 (FR2) frequency band,
  identifying that an error has occurred in the first RFFE,
  based on the error, selecting a second frequency included in the FR1 frequency band,
  performing the communication based on the second frequency included in the FR1 frequency band, updating UE capability information by removing information indicating that a frequency of the FR2 frequency band is supported, and
transmitting the updated UE capability information to a base station.

* * * * *